(12) United States Patent
Chaudhry et al.

(10) Patent No.: US 12,547,769 B2
(45) Date of Patent: Feb. 10, 2026

(54) SYSTEMS AND METHODS FOR CONFIGURING AND OPERATING DE-IDENTIFICATION SYSTEMS

(71) Applicant: SURGICAL SAFETY TECHNOLOGIES INC., New York, NY (US)

(72) Inventors: Amar S. Chaudhry, Toronto (CA); Frank Rudzicz, Toronto (CA); Tianbao Li, Toronto (CA); Shuja Khalid, Toronto (CA); Kevin Yang, Toronto (CA); Teodor Pantchev Grantcharov, Toronto (CA)

(73) Assignee: SURGICAL SAFETY TECHNOLOGIES INC., New York, NY (US)

( * ) Notice: Subject to any disclaimer, the term of this patent is extended or adjusted under 35 U.S.C. 154(b) by 104 days.

(21) Appl. No.: 18/026,641

(22) PCT Filed: Sep. 15, 2021

(86) PCT No.: PCT/CA2021/051285
§ 371 (c)(1),
(2) Date: Mar. 16, 2023

(87) PCT Pub. No.: WO2022/056628
PCT Pub. Date: Mar. 24, 2022

(65) Prior Publication Data
US 2024/0028762 A1   Jan. 25, 2024

Related U.S. Application Data

(60) Provisional application No. 63/079,072, filed on Sep. 16, 2020.

(51) Int. Cl.
*G06F 21/62* (2013.01)
*G06F 3/0482* (2013.01)
*G16H 10/60* (2018.01)

(52) U.S. Cl.
CPC ........ *G06F 21/6254* (2013.01); *G06F 3/0482* (2013.01); *G16H 10/60* (2018.01)

(58) Field of Classification Search
CPC .. F06F 21/6254; F06F 21/6245; G16H 10/60; G16H 10/20; G06F 21/6254; G06F 21/6245
See application file for complete search history.

(56) References Cited

U.S. PATENT DOCUMENTS 11,138,337 B2 * 10/2021 Yousfi ................. G06F 21/6254
11,436,191 B2 *  9/2022 Kuo ....................... G16H 10/60
(Continued)

FOREIGN PATENT DOCUMENTS

EP    3188058 A1 *  7/2017
WO    2016002086 A1   1/2016

OTHER PUBLICATIONS

European Patent Office (EPO), Extended European Search Report issued to EP 21867982.7 dated Sep. 26, 2024.
(Continued)

*Primary Examiner* — Nam T Tran
(74) *Attorney, Agent, or Firm* — NZ Carr Law Office

(57) ABSTRACT

Systems, devices, and methods of configuring and operating a de-identification system are provided. At least one electronic data model is maintained, which includes a plurality of de-identification requirements for removing personal information from clinical data obtained in a clinical environment, the plurality of de-identification requirements including requirements applicable to at least one jurisdiction of a plurality of jurisdictions. An identifier identifying one of
(Continued)

the jurisdictions is received. The data model is traversed to determine a subset of the de-identification requirements applicable to the identified jurisdiction. Data defining a user selection of operating parameters of the de-identification system are received. The user selection is analyzed for conformity with the subset of de-identification requirements. In response to determining the user selection conforms with the subset of de-identification requirements, a signal is generated indicating the conformity. A configuration data structure is generated including data reflective of the user selection of operating parameters.

20 Claims, 20 Drawing Sheets

(56) References Cited

U.S. PATENT DOCUMENTS

| | | | | |
|---|---|---|---|---|
| 2006/0123341 A1* | 6/2006 | Smirnov | ............... | G06F 3/0481 |
| | | | | 715/764 |
| 2011/0087651 A1* | 4/2011 | Westin | ................... | G16H 30/40 |
| | | | | 707/E17.044 |
| 2012/0266254 A1 | 10/2012 | Gupta et al. | | |
| 2019/0272387 A1* | 9/2019 | Gkoulalas-Divanis | ...................... | |
| | | | | G06F 21/6254 |

OTHER PUBLICATIONS

Canadian Intellectual Property Office (CIPO), International Search Report and Written Opinion to PCT/ CA2021/051285, Nov. 30, 2021.

* cited by examiner

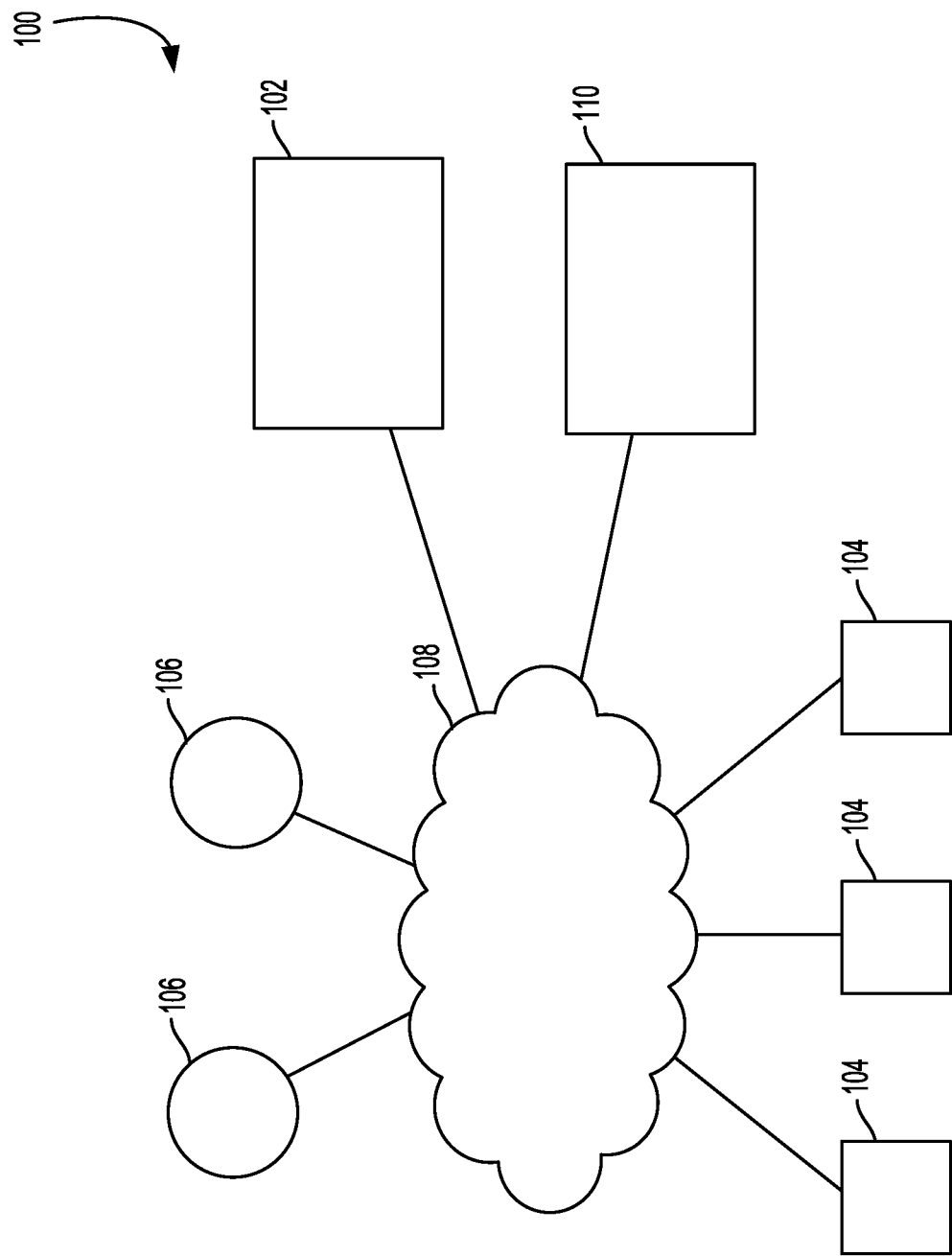

SYSTEMS AND METHODS FOR CONFIGURING AND OPERATING DE-IDENTIFICATION SYSTEMS

CROSS-REFERENCE TO RELATED APPLICATIONS

This application claims all benefit, including priority of U.S. Provisional Patent Application No. 63/079,072, filed Sep. 16, 2020, the entire contents of which are incorporated herein by this reference.

FIELD

This disclosure relates to generating and utilizing configuration data structures, and more particularly relates to generating and utilizing configuration data structures for de-identifying clinical data.

BACKGROUND

Data captured in clinical environments can include personal information of the patient being treated and the physicians performing the treatment, as well as other personal information associated with the clinical procedure. This increases the risk that personal information can be accessed by unauthorized users.

Accordingly there is a need to process such data in manners which decrease the risk of personal information being accessed by unauthorized users.

SUMMARY

In accordance with an aspect, there is provided a computer-implemented method for configuring a de-identification system. The method includes maintaining at least one electronic data model including a plurality of de-identification requirements for removing personal information from clinical data obtained in a clinical environment, the plurality of de-identification requirements including requirements applicable to at least one jurisdiction of a plurality of jurisdictions; receiving an identifier identifying one of the jurisdictions; traversing the data model to determine a subset of the de-identification requirements applicable to the identified jurisdiction; receiving data defining a user selection of operating parameters of the de-identification system; analyzing the user selection for conformity with the subset of de-identification requirements; in response to determining the user selection conforms with the subset of de-identification requirements, generating a signal indicating the conformity; and generating a configuration data structure including data reflective of the user selection of operating parameters.

In accordance with another aspect, there is provided a computer-implemented system for configuring a de-identification system. The system includes a processor connected to a non-transitory computer readable storage medium with executable instructions for causing the processor to: maintain at least one electronic data model including a plurality of de-identification requirements for removing personal information from clinical data obtained in a clinical environment, the plurality of de-identification requirements including requirements applicable to at least one jurisdiction of a plurality of jurisdictions; receive an identifier identifying one of the jurisdictions; traverse the data model to determine a subset of the de-identification requirements applicable to the identified jurisdiction; receive data defining a user selection of operating parameters of the de-identification system; analyze the user selection for conformity with the subset of de-identification requirements; in response to determining the user selection conforms with the subset of de-identification requirements, generate a signal indicating the conformity; and generate a configuration data structure including data reflective of the user selection of operating parameters.

In accordance with another aspect, there is provided a computer-implemented system for de-identifying clinical data. The system includes: a processor connected to a non-transitory computer readable storage medium with executable instructions for causing the processor to: receive a configuration data structure including one or more de-identification parameters; retrieve one or more processing algorithms from a data repository capable of processing clinical data in accordance with the one or more de-identification parameters; receive clinical data obtained in a clinical environment; process the clinical data with the selected one or more processing algorithms to generate de-identified clinical data; and output the de-identified clinical data.

In accordance with another aspect, there is provided a computer-implemented method for de-identifying clinical data. The method includes: receiving a configuration data structure including one or more de-identification parameters; retrieving one or more processing algorithms from a data repository capable of processing clinical data in accordance with the one or more de-identification parameters; receiving clinical data obtained in a clinical environment; processing the clinical data with the selected one or more processing algorithms to generate de-identified clinical data; and outputting the de-identified clinical data.

In accordance with yet another aspect, there is provided a non-transitory computer readable tangible storage medium storing executable code. When the executable code is executed by a processor, the processor performs any one of the methods of the aspects described above.

Many further features and combinations thereof concerning embodiments described herein will appear to those skilled in the art following a reading of the instant disclosure.

BRIEF DESCRIPTION OF THE DRAWINGS

Embodiments will be described, by way of example only, with reference to the attached figures, wherein in the figures:

FIG. 1A is a network diagram of a de-identification system, in accordance with an embodiment;

Figure 1B:
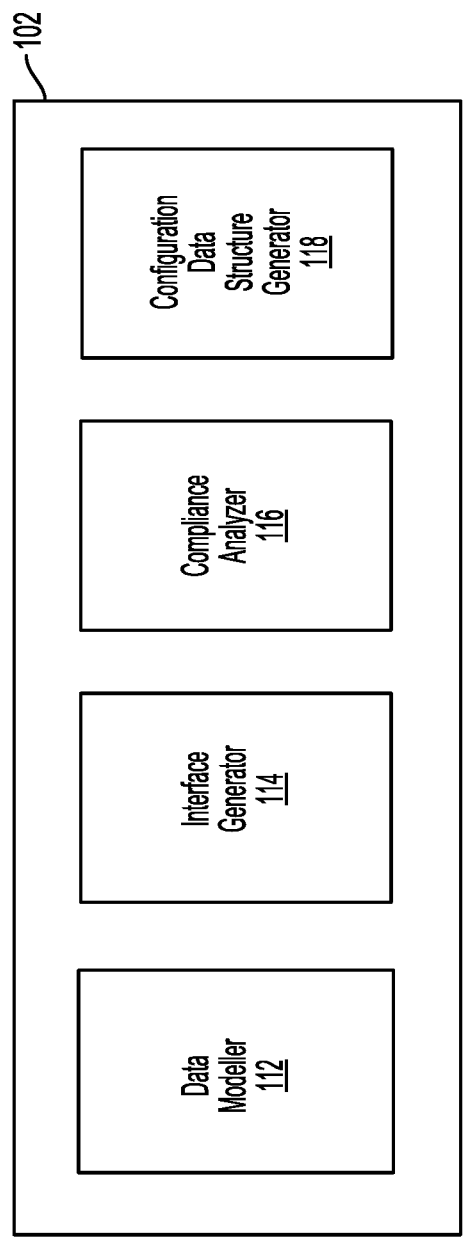
FIG. 1B is a schematic diagram of a configuration computing device for configuring the de-identification system of FIG. 1A, in accordance with an embodiment.

These drawings depict exemplary embodiments for illustrative purposes, and variations, alternative configurations, alternative components and modifications may be made to these exemplary embodiments.

DETAILED DESCRIPTION

FIG. 1A is a network diagram for a de-identification system 100, in accordance with an embodiment. The de-identification system 100 is configured in manners detailed herein to process data generated or otherwise obtained in a clinical environment to remove person information, including, e.g., information allowing individuals to be identified or other sensitive information of a particular individual. Such clinical environment data may include, for example, audio data, video data, audio-video data, device data, text data, or the like, and may be referred to as clinical data, for convenience.

In the depicted embodiment, the de-identification system 100 includes a configuration device 102 for configuring operation of the system 100 to process clinical data for de-identification purposes. The configuration device 102 generates configuration data structures storing data (e.g., instructions, operating parameters, or the like) for controlling aspects of system 100. The configuration data structures includes one or more data structures for controlling how clinical data are processed to remove personal information. For example, the configuration data structures may include data structures for controlling de-identification processes. The configuration data structures may also include data structures for controlling encryption processes such as, for example, keys, hashing parameters, etc.

In the depicted embodiment, the system 100 also includes a de-identification device 110 for processing clinical data, in accordance with the configuration data structures generated at the configuration device 102. The de-identification device 110 processes clinical data by applying various data processing algorithms and models (e.g., for audio and/or video processing) to remove personal information.

The configuration device 102 may transmit generated configuration data structures to the de-identification device 110. The configuration device 102 may also transmit generated configuration data structures to computing devices extrinsic to the de-identification system 100. The configuration device 102 may also transmit generated configuration data structures to a client device 104 for use at such device or for re-transmission to one or more other devices.

In an embodiment, the functionality of de-identification device 110 and configuration device 102 as described herein may be implemented at a single computing device. In an embodiment, the functionality of de-identification device 110 and/or configuration device 102 as described herein may be implemented in a plurality of computing devices (e.g., organized as a computing cluster or a computing cloud).

The configuration device 102 is interconnected with de-identification device 110 and with one or more data sources 106 by way of a communication network 108.

Each data source 106 stores data records of one or more de-identification requirements reflective of rules for de-identifying clinical data based on one or more authorities. A data source 106 may, for example, be operated by a third party, such as a health agency, a public safety regulator, or other governmental or quasi-governmental agency. A data source 106 may be operated by an administrator of the configuration device 102. In some embodiments, a data source 106 is operated by an insurer. A data source 106 can also be operated by a third party aggregator which aggregates de-identification requirements from various sources.

In some embodiments, data obtained from one or more of the data sources 106 are maintained in one or more electronic databases at the configuration device 102, e.g., in a memory (e.g., memory 1904 in FIG. 19) of the configuration device 102, which memory may be in the form of a disk for persistent storage, or otherwise.

The configuration device 102 can be further interconnected with one or more client devices 104 by way of the communication network 108. A client device 104 may receive data from one or more data sources 106. The configuration device 102 presents to an end user one or more interfaces generated at the configuration device 102. A client device 104 may receive user input by way of such interfaces and transmit data reflective of such user input to the configuration device 102.

In some embodiments, a client device 104 may receive a configuration data structure generated at the configuration device 102, and augment, update, or otherwise interact with such data structure.

The one or more client devices 104 may include one or more devices of various types capable of receiving information from, and providing information to, the configuration device 102 via the communication network 108. For example, a client device 104 may be a desktop, laptop or tablet computer; a client device 104 may also be a server capable of implementing or storing the configuration data structure to process clinical data.

The communication network 108 may include a packet-switched network portion, a circuit-switched network portion, or a combination thereof. Communication network 108 may include wired links, wireless links such as radio-frequency links or satellite links, or a combination thereof. Communication network 108 may include wired access points and wireless access points. Portions of communication network 108 could be, for example, an IPv4, IPv6, X.25, IPX or similar network. Portions of network 108 could be, for example, a GSM, GPRS, 3G, LTE or similar wireless networks. Communication network 108 may include or be connected to the Internet. When communication network 108 is a public network such as the public Internet, it may be secured as a virtual private network.

FIG. 1B is a high-level schematic diagram of the configuration device 102, in accordance with an embodiment. As depicted, the configuration device 102 includes a data modeller 112, an interface generator 114, a compliance analyzer 116, and a configuration data structure generator 118.

The data modeller 112 maintains at least one electronic data model which includes one or more de-identification requirements for removing personal information from audio-video data (hereinafter referred to as clinical data) obtained in a clinical environment (e.g., operating room video footage of a surgery). The electronic data model includes associations between de-identification requirements with a variety of operating parameters or identifiers. For example, the electronic data model may include an association between a rule for removing personal information with an identifier of a jurisdiction which requires said rule.

The clinical data may include data obtained from a clinical environment using various suitable sensors including any combination of one or more 2D cameras, stereoscopic cameras, 3D cameras including cameras with depth sensing capabilities, infra-red cameras, microphones and other audio sensors, or the like.

As used herein, a jurisdiction may refer to any regime of rules, such as a legal or regulatory regime (which may be referred to as a "compliance" regime). A compliance regime may be associated with a particular regulatory body or government, or a particular geography. Compliance regimes may also include a contractual compliance regime, a site-specific compliance regime, a professional obligation compliance regime, an insurer mandated compliance regime, and so forth.

In some embodiments, for example, data modeller 112 is preconfigured with at least one electronic data model with one or more de-identification requirements.

The data modeller 112 may maintain one or more electronic data models, such as by generating an electronic data model, updating an electronic data model with new de-identification requirements and associated identifiers or operating parameters, and responding to requests for an electronic data model. Maintaining the electronic data models may include retrieving one or more de-identification requirements from an electronic database (e.g., a data source 106), and populating the electronic data model by associating the retrieved one or more de-identification requirements with one or more identifiers, e.g., at least one jurisdiction identifier of a plurality of jurisdictions which matches the respective jurisdiction.

The interface generator 114 may generate, update, or augment graphical user interfaces, each having one or more user interface elements for user selection of operating parameters of a de-identification system, or convey information related to configuring a de-identification system.

According to some embodiments, for example, user interface elements are linked together, such that a user selection of a first user interface element may prompt the interface generator 114 to display a linked second interface element. Various amounts of linking, or chains of linked, user interface elements are contemplated. For example, a user interface element may link to one, or two, or more other user interface elements, and various user interface elements may link to separate and discrete linking user interface elements, creating parallel user interface element chains.

The compliance analyzer 116 analyzes user selections for conformity with the de-identification requirements. For example, the compliance analyzer 116 may determine whether only blurring patients' faces conforms with de-identification requirements of the jurisdiction where the clinical procedure is being performed. In one example application, determining whether the user selections conform with the de-identification requirements satisfies requirements of a quality assurance policy. For example, the quality assurance policy may be imposed by the manufacturer of the de-identification software, the care provider, etc. Determining whether the user selections conform with the de-identification requirements may be conducted as part of a quality assurance process.

The configuration data structure generator 118 generates configuration data structures based on user selections of operating parameters. For example, configuration data structure generator 118 may generate a metadata file which specifies a recognition algorithm and an obscuring algorithm to be used to de-identify data. In some embodiments, the configuration data structure generator 118 generates metadata specifying a type of recognition algorithm (e.g., head/body/object detection algorithm(s), facial recognition algorithms, etc.) and a type of obscuring algorithm (e.g., a blurring algorithm).

User interface elements can include various visual elements which convey information to the user. According to some embodiments, for example, user interface elements include elements for receiving a user selection, such as a checkbox. In some embodiments, for example, the user interface elements include text or other images to convey information. The user interface elements may combine or integrate the visual elements for receiving a user selection and the visual elements which convey information. For example, a user interface element may have a text descriptor which can be selected by the user for subsequent action.

Figure 2:
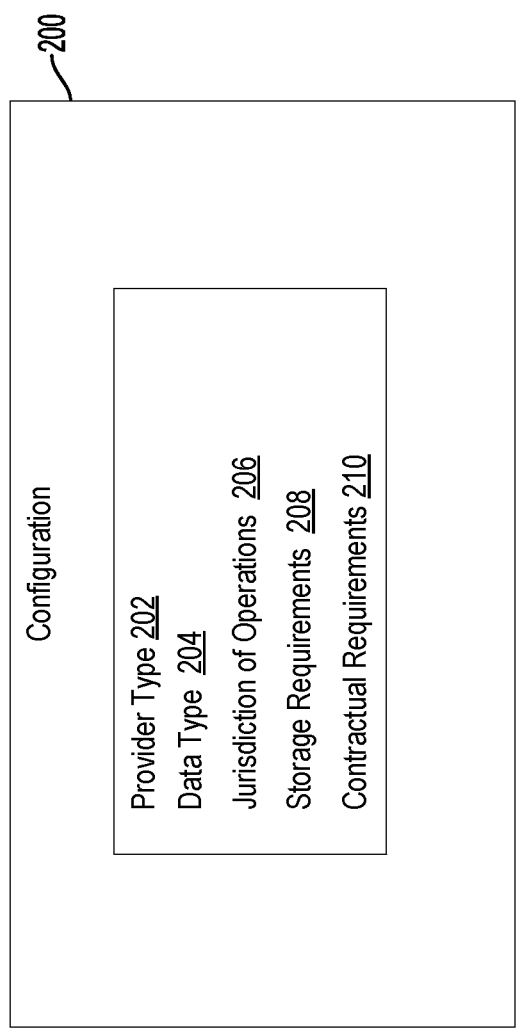
FIG. 2, FIG. 3, FIG. 4, FIG. 5, FIG. 6, and FIG. 7 each is a visual representation of an interface for configuring the de-identification system of FIG. 1A, in accordance with an embodiment.

FIG. 2 is a visual representation of interface 200 for configuring a de-identification system for clinical data, according to an embodiment. Interface 200 may include one or more user interface elements generated by the interface generator 114.

In the shown embodiment, interface 200 includes various user interface elements. For example, interface 200 includes a first user interface element 202 that requests a user to provide de-identification requirement identifiers associated with a service provider type; a second user interface element 204 that requests the user to identify the types of data being handled; a third user interface element 206 that requests the user to identify the relevant jurisdiction where data will be captured, processed, or otherwise handled; a fourth user interface element 208 that requests the user to input de-identification requirement identifiers associated with storage of the generated clinical data; and a fifth user interface element 210 that requests the user to input de-identification requirement identifiers associated with a compliance regime, such as a contractual obligation, insurer mandated scheme, etc.

In various embodiments, the interface 200 may have various combinations of one or more of the depicted user interface elements or other user interface elements. For example, the interface 200 may have only the interface element 206 for identifying a jurisdiction, or only the interface element 204 and the interface element 206, and so forth.

In response to the user selection of any of the user interface elements (e.g., 202, 204, 206, 208, and 210), the interface 200 may be configured to provide linked user interface elements which provide further information about a particular selected interface element.

Figure 3:
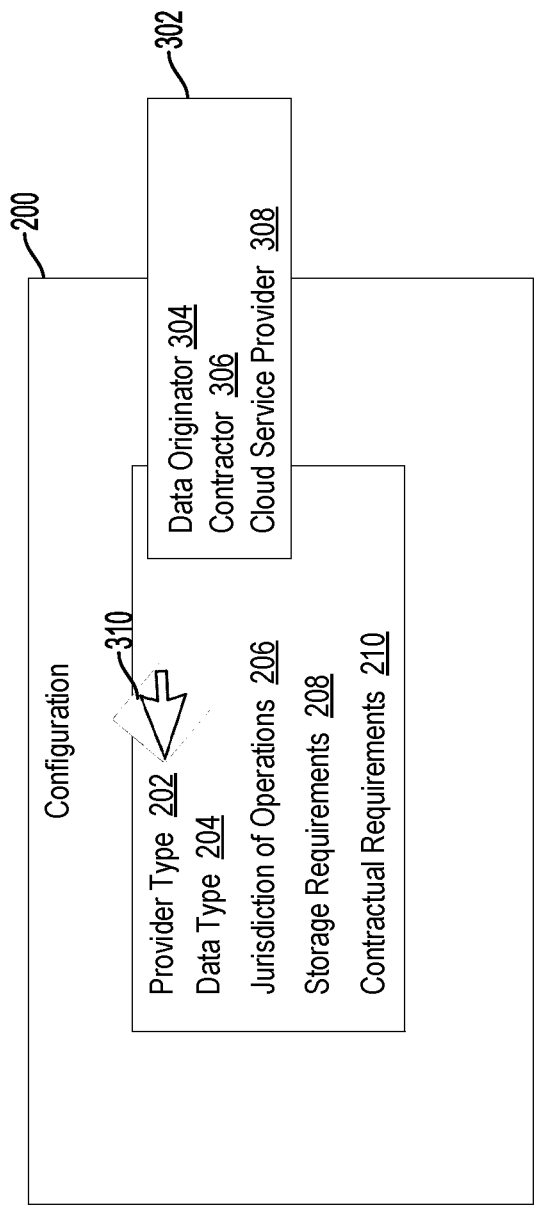

FIG. 3 is a visual representation of interface 200 for configuring de-identification of clinical data which may be presented upon user selection of service provider type interface element 202.

In some embodiments, the user selection is detected where the interface generator 114 detects that a user navigation tool 310 (e.g., a mouse cursor or touch input) is within a threshold distance of the user interface element (e.g., first user interface element 202). Stated alternatively, the interface generator 114 may, in response to determining hovering near a user interface element, by the user navigation tool 310, display the linked user interface elements. The interface generator 114 may be configured to detect the user selection based on an active user selection, such as a click on the text of the user interface element, and so forth.

In some embodiments, the linked interface 302 includes one or more user interface elements representative of selectable de-identification requirement identifiers associated with the user selection of the first user interface element 202. The interface generator 114 may be configured to, in response to receiving a user selection of the selectable de-identification requirement identifiers, update the interface 200 to include subsequent linked interfaces. Various number of further interfaces or user interface elements are contemplated.

User selection of the selectable de-identification requirement identifiers can be interpreted by the compliance analyzer 116 to either determine de-identification requirements, or to determine whether de-identification requirements are complied with or satisfied. For example, where the user selection includes a de-identification requirement identifier can be used by compliance analyzer 116 to determine a subset of de-identification requirements.

In the shown embodiment, the linked interface 302 includes data originators de-identification requirement identifier 304, the contractor de-identification requirement identifier 306, and the cloud service de-identification requirement identifier 308.

The data originators de-identification requirement identifier 304 may be used by compliance analyzer 116 to determine the de-identification requirements associated with the type of service provider under the Health Insurance Portability and Accountability Act (HIPPA). Further describing the example, where the user selection is indicative of the cloud service de-identification requirement identifier 308, the compliance analyzer 116 may allow the de-identification requirements to be partially satisfied by another party. In contrast, where the user selection is indicative of the originator de-identification requirement identifier 304, the compliance analyzer 116 may require that all de-identification requirements be satisfied. The contractor de-identification requirement identifier 306 may be used for institutions which are neither the cloud service provider, nor the originator (e.g., a research institution) and have de-identification requirements which are a combination of the two.

Figure 4:
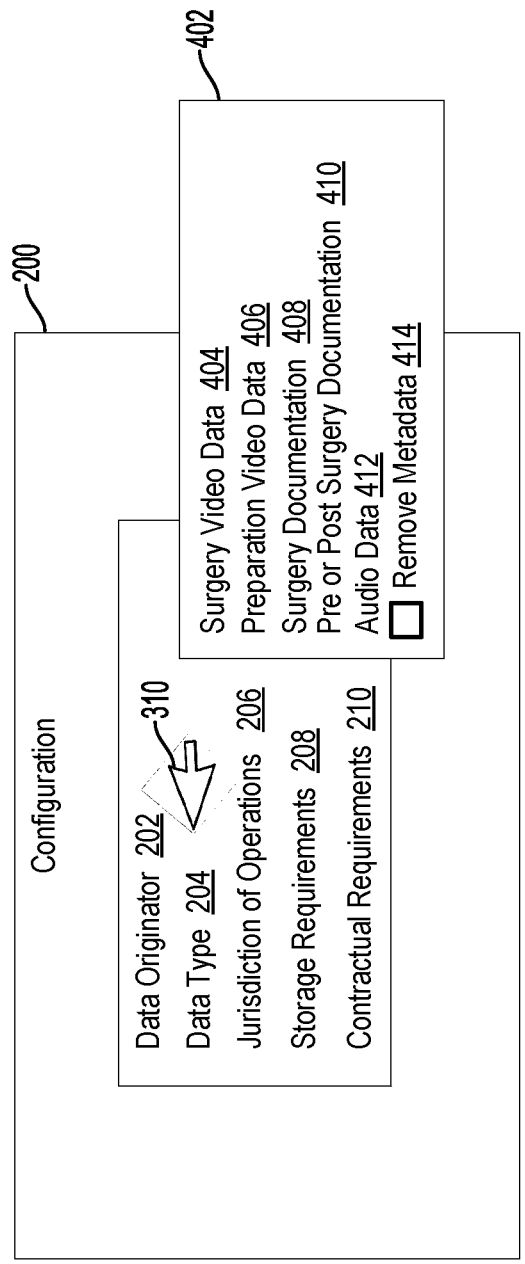

FIG. 4 is a visual representation of interface 200 for configuring de-identification of clinical data which may be presented upon user selection of data type interface element 204.

As shown in FIG. 4, interface generator 114 detects user selection of user interface element 204, and in response, updates interface 200 to include the linked interface 402.

Similar to linked interface 302, the shown linked interface 402 includes one or more selectable user interface elements representative of selectable de-identification requirement identifiers. User selection of the selectable de-identification requirement identifiers can be interpreted by the compliance analyzer 116 to either determine de-identification requirements, or to determine whether de-identification requirements are complied with or satisfied.

In the shown embodiment, the linked interface 402 includes surgery video data de-identification requirement identifier 404, preparation video data parameter 406, surgery documentation de-identification requirement identifier 408, pre- or post-surgery documentation de-identification requirement identifier 410, and audio data de-identification requirement identifier 412.

The surgery video data de-identification requirement identifier 404, if selected, may be used by the compliance analyzer 116 to traverse the data model to determine a subset of de-identification requirements applicable to clinical video data. For example, the compliance analyzer 116 may traverse the electronic data model to determine a subset of de-identification requirements associated with video data, as opposed to text data for example. The de-identification requirements may specify treatment of visual identifying elements or personal information, such as a person's face, tattoos, etc., and de-identification requirements specifying treatment of audio information, such as voice tone, pitch, cadence, and so forth.

The de-identification requirement identifier may also be representative of obligations to preserve features within the video data. For example, the de-identification requirement identifier may specify that de-identification locks or prevents subsequent processing of the video data elements which are not de-identified.

In some embodiments, surgery video data de-identification requirement identifier 404 (or any de-identification requirement identifier), if selected, may be used by the interface generator 114 to determine whether to display a linked interface (e.g., interface 500, as described with reference to FIG. 5).

User selection of preparation video data de-identification requirement identifier 406 may be used by the compliance analyser 116 to determine the de-identification requirements associated with video data showing preparation for the clinical procedure. The identification requirements may specify that the video data is de-identified by, for example, removing some sensitive information, but preserving some personal information to allow identification of the individual. According to some embodiments, for example, the identification requirements may specify that the video data is allowed to be stored using a greater compression rate, as a result of being ancillary to the clinical treatment provided.

User selection of surgery documentation de-identification requirement identifier 408, may cause the compliance analyser 116 to traverse the electronic data model to determine de-identification requirements associated with documentation. The de-identification requirements may specify processing of certain text or images in the documentation to remove personal information, such as a name, address, medical history, etc. Such removal may be effected, for example, by blurring or redacting. The de-identification requirements may also specify treatment of documentation data where there is uncertainty, damage, or other non-interpretable elements. For example, the de-identification requirements may specify that unrecognizable text be blurred.

De-identification requirements associated with documentation may specify that de-identification of documents is reversible. For example, de-identification of documentation may be used primarily as a back-up or redundant form of encryption for storing documentation.

Selection of the pre- or post-surgery documentation de-identification requirement identifier 410 may be used by the compliance analyser 116 to determine the de-identification requirements associated with pre- or post-surgery documentation. The identification requirements may specify that the documentation data is de-identified by, for example, removing all patient personal information (e.g., name, address, etc.), but not all personal information associated with the employees or staff of the service provider. According to some embodiments, for example, the identification requirements may specify that the video data is allowed to be stored using a greater compression rate, as a result of being ancillary to the clinical treatment provided.

In some embodiments, the linked interface 402 includes a metadata removal de-identification requirement identifier 414. The metadata removal de-identification requirement identifier 414, when selected by the user, is used by the configuration data generator 118 to generate configuration data structures which will remove metadata from the audio-video data being processed by the de-identification system 100. For example, the configuration data structure may be configured so as to remove metadata such as a name, identifiers of geographic subdivisions smaller than a state, (e.g., including street address, city, country, precinct, zip codes, etc.), all elements of dates (e.g., all dates related to a patient, such as an admission date, birth date, discharge date, etc., and dates indicating age), telephone numbers, fax numbers, email addresses, fax numbers, social security numbers, medical record numbers, health plan numbers, account numbers, certificate or license numbers, vehicle identification numbers (e.g., related to the vehicle or the registration, such as license plates), Universal Resource Locators (URLs), Internet Protocol addresses (IP addresses), or any other unique identifying number, characteristic, or code, and to remove audio-video data specific metadata (e.g., video metadata), such as the creation time, the type or other identifying information related to the device capturing the audio-video data, and title (which may be auto generated by the system or the device).

In some embodiments, the metadata removal de-identification requirement identifier 414 is used by the configuration data generator 118 to generate configuration data structures which include instructions to have a metadata removal algorithm remove various metadata within documentary, audio, audio-visual data, or other clinical data. For example, the metadata removal algorithm may be configured to remove metadata from within the data, such as the name, geographic subdivisions smaller than a state, (e.g., including street address, city, country, precinct, zip codes, etc.), all elements of dates (e.g., all dates related to a patient, such as an admission date, birth date, discharge date, etc., and dates indicating age), telephone numbers, fax numbers, email addresses, fax numbers, social security numbers, medical record numbers, health plan numbers, account numbers, certificate or license numbers, vehicle identification numbers (e.g., related to the vehicle or the registration, such as license plates), device identification numbers, Universal Resource Locators (URLs), Internet Protocol addresses (IP addresses), or any other unique identifying number, characteristic, or code. For example, the metadata removal algorithm may be a machine learning algorithm which reviews textual information (e.g., clinical records) to remove any of the above referenced metadata. In another example, the metadata removal algorithm may be a machine learning algorithm which reviews video data (e.g., images of clinical records) to remove any of the above referenced metadata by identifying the metadata as a visual element (e.g., the algorithm identifies the visual representation of the text version of a patient name). The visual data may be obscured, similar to obscuring techniques described herein.

In some embodiments, the metadata removal algorithm for removing metadata within or about clinical data identifies metadata based on previous examples of clinical documents which have had their metadata removed. For example, the metadata removal algorithm may include a list of various prohibited entries which, if detected in the clinical data, are required to be removed (e.g., all text associated with the DOB (date of birth) tag or entry line is removed). In some embodiments, the machine learning algorithm may include various correlation entries, which remove entries related to prohibited entries. For example, the correlation entries may be entries which are synonyms for the prohibited entries, and require removal as well.

In some embodiments, the metadata removal algorithm may access various databases to retrieve keywords to be removed from metadata (e.g., names or other identifiers). For example, the metadata removal algorithm may at least in part cross reference patient names which are already stored in a clinical data database to process newly received clinical data. For example, the metadata removal algorithm may remove any new instances of John Smith, which matches an existing patient. Similarly, the metadata removal algorithm may remove any metadata which is institution or geography specific by maintaining or retrieving metadata associated with said institution or specific geography (e.g., hospital names, local hospital administrators, national insurers, etc.).

In some embodiments, the metadata removal algorithm is a machine learning algorithm trained to recognize metadata based on previous examples of clinical documents which have had their metadata removed. The machine learning algorithm training may incorporate a dictionary or thesaurus to define metadata identifying terms or features. For example, the machine learning algorithm may ingest the dictionary to determine terms which are not synonyms, but nevertheless relate to prohibited terms. The machine learning algorithm may be an algorithm which relies upon a pre-trained word embedding algorithm, which maps the interrelation between terms, a bag of words algorithm, which applied various values to instances of words in text, or other NLP based approaches.

In some embodiments, the machine learning model incorporates long short term memory units (or various other recurrent neural networks), or various other machine learning approaches to identify metadata.

In some embodiments, the metadata removal algorithm may be a combination of an entry based system and a machine learning algorithm. For example, the entry based system may be applied first, subsequent to which the machine learning algorithm is applied.

The metadata removal algorithm may be general, or trained or calibrated for a specific institution, geography, etc.

In some embodiments, the metadata removal de-identification requirement identifier 414 may be a separate linked interface with various constituent identifiers allowing for user selection of various metadata removal parameters, such as the removal of metadata generally or audio-video specific metadata. For example, the metadata removal de-identification requirement identifier 414 may be a linked interface having one or more de-identification requirement identifiers for removing metadata, such as the file name, the time the audio-video data was captured, the file storage structure of the audio-video data.

In some embodiments, the interface generator 114 generates a new interface, or updates various interfaces or linked interfaces to include the metadata removal de-identification requirement identifier 414. For example, the interface generator 114 may populate either the interface 200, the linked interface 300, or the linked interface 402 with the metadata removal de-identification requirement identifier 414.

De-identification requirements associated with user selection of audio data de-identification requirement identifier 412 may be a subset of the de-identification requirements associated with the video data.

Figure 5:
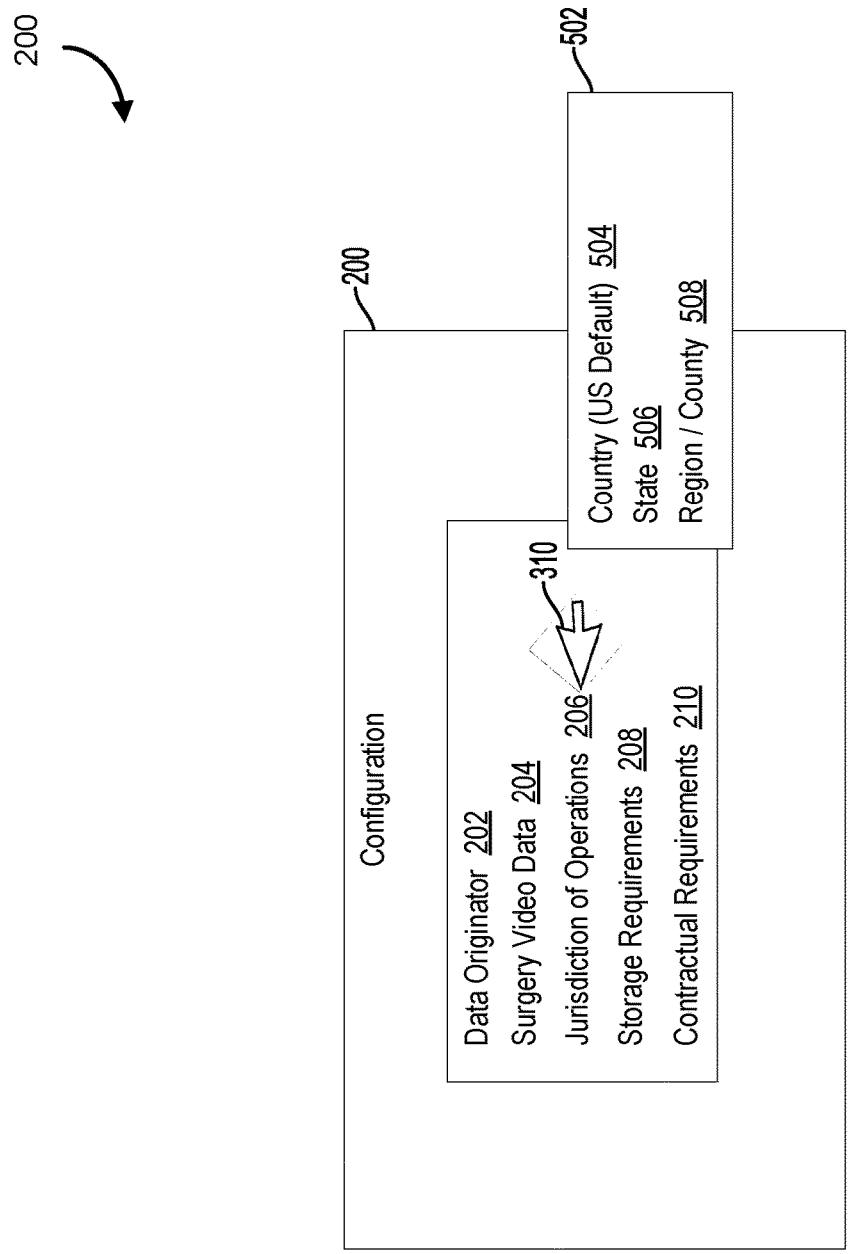

FIG. 5 is a visual representation of interface 200 for configuring de-identification of clinical data which may be presented upon user selection of jurisdiction identification user interface element 206.

As shown in FIG. 5, the interface generator 114 detects user selection of user interface element 206, and in response, updates interface 200 to include the linked interface 502.

Similar to linked interface 302, the linked interface 502 includes one or more user interface elements representative of selectable de-identification requirement identifiers.

In the shown embodiment, the linked interface 502 includes jurisdiction de-identification requirement identifier 504, sub-jurisdiction de-identification requirement identifier 506, and second sub-jurisdiction de-identification requirement identifier 508.

The jurisdiction de-identification requirement identifier 504, if selected, may be used by the compliance analyzer 116 to traverse the data model to determine a subset of de-identification requirements applicable to the clinical data (e.g., of a type selected in interface 402) in the jurisdiction where said data is being processed or stored. For example, the compliance analyzer 116 may traverse the electronic data model to determine a subset of de-identification requirements associated with the United States of America, as opposed to Canada. The de-identification requirements associated with the jurisdiction may specify treatment of the clinical data, such as where the data must be stored, which types of de-identification are acceptable, and so forth.

Similar to jurisdiction de-identification requirement identifier 504, the sub-jurisdiction de-identification requirement identifier 506, and the second sub-jurisdiction de-identification requirement identifier 508 may be used by the compliance analyzer 116 to traverse the data model to determine a subset of de-identification requirements applicable to the clinical data for that sub-jurisdiction. The jurisdiction de-identification requirement identifier 504, the sub-jurisdiction de-identification requirement identifier 506, and the second sub-jurisdiction de-identification requirement identifier 508 can be linked, such that selection of an umbrella jurisdiction in country de-identification requirement identifier 504 narrows the sub-jurisdiction de-identification requirement identifier 506 to choices within a country, and similarly selection of an umbrella jurisdiction in sub-jurisdiction de-identification requirement identifier 506 narrows the second sub-jurisdiction de-identification requirement identifier 508 to choices within the a state. Various numbers of jurisdictional de-identification requirement identifiers are contemplated.

In the shown embodiment, the sub-jurisdiction de-identification requirement identifier 506 is associated with de-identification rules imposed on a state-wide level, and the second sub-jurisdiction de-identification requirement identifier 508 is associated with de-identification rules imposed on a region or county wide level. Further explaining the example, user selection of the New York jurisdiction de-identification requirement identifier 504 may cause compliance analyzer 116 to traverse the data model to determine a subset of de-identification requirements applicable to the New York, as opposed to California.

Each of the user interface elements associated with de-identification requirement identifiers may include integrated user interface elements. For example, the user interface element representative of the jurisdiction de-identification requirement identifier 504 may include a drop down menu, permitting a user to scroll through the drop down menu and select a relevant jurisdiction.

The de-identification requirements may also include obligations to preserve features within the video data. For example, the de-identification requirements may specify that de-identification locks or prevents subsequent processing of the video data elements which are not de-identified.

Figure 6:
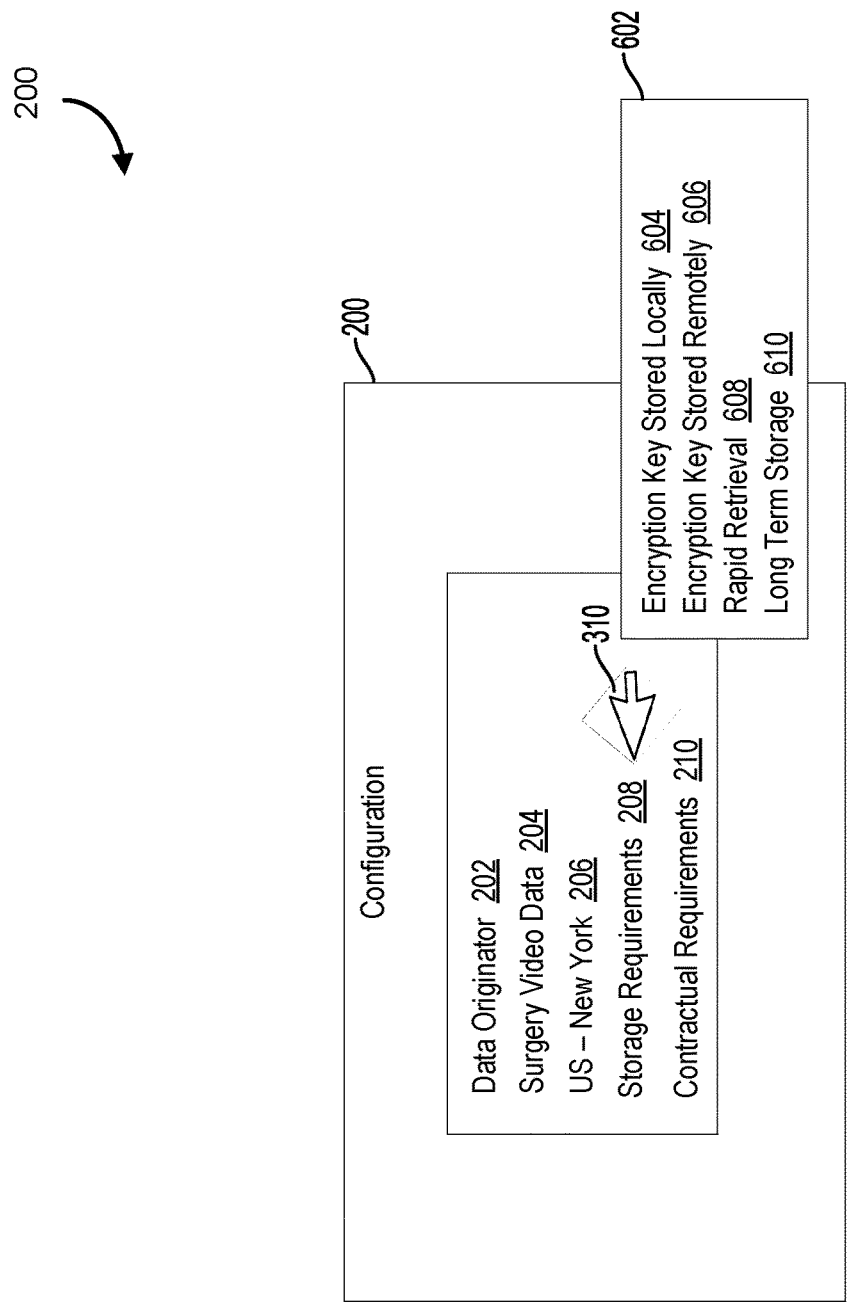

FIG. 6, a visual representation of interface 200 having linked interface 602 for configuring de-identification of clinical data which may be presented upon user selection of storage requirements user interface element 208.

Similar to linked interface 302, the linked interface 602 includes one or more user interface elements representative of selectable de-identification requirement identifiers.

In the shown embodiment, the linked interface 602 includes local encryption key storage de-identification requirement identifier 604, remote encryption key storage de-identification requirement identifier 606, a first storage retrieval speed de-identification requirement identifier 608 and second storage retrieval speed de-identification requirement identifier 610.

The local encryption key storage de-identification requirement identifier 604, if selected, may be used by the compliance analyzer 116 to traverse the electronic data model to identify which de-identification requirements are compatible with storing an encryption/decryption key locally. For example, if the clinical data is being encrypted at a client device (e.g., client device 104), complying with the local encryption key requirement may be contingent solely upon performance by the client device.

Similar to local encryption key storage de-identification requirement identifier 604, selection of the remote encryption key storage de-identification requirement identifier 606, may be used by the compliance analyzer 116 to traverse the data model to determine a subset of de-identification requirements applicable to remote key encryption storage. For example, if the clinical data is being encrypted at a client device (e.g., client device 104), and the encryption/decryption key is being stored at the client device, the de-identification requirements may be contingent upon performance by the client device and impose rules governing the relationship between the remote encryption key storage operator.

The first storage retrieval speed de-identification requirement identifier 608, and the second storage retrieval speed de-identification requirement identifier 608, if selected, may be used by the compliance analyzer 116 or the interface generator 114 to traverse the electronic data model to identify which de-identification requirements are compatible with a required retrieval speed. For example, if the de-identified clinical data is being stored remotely, there may be de-identification requirements associated with retrieval from a "cold storage", whereby the user is required to be able to provide a patient or regulator with a copy of the de-identified clinical data within a certain period of time, which may be satisfied by a first speed and not a second speed.

Figure 7:
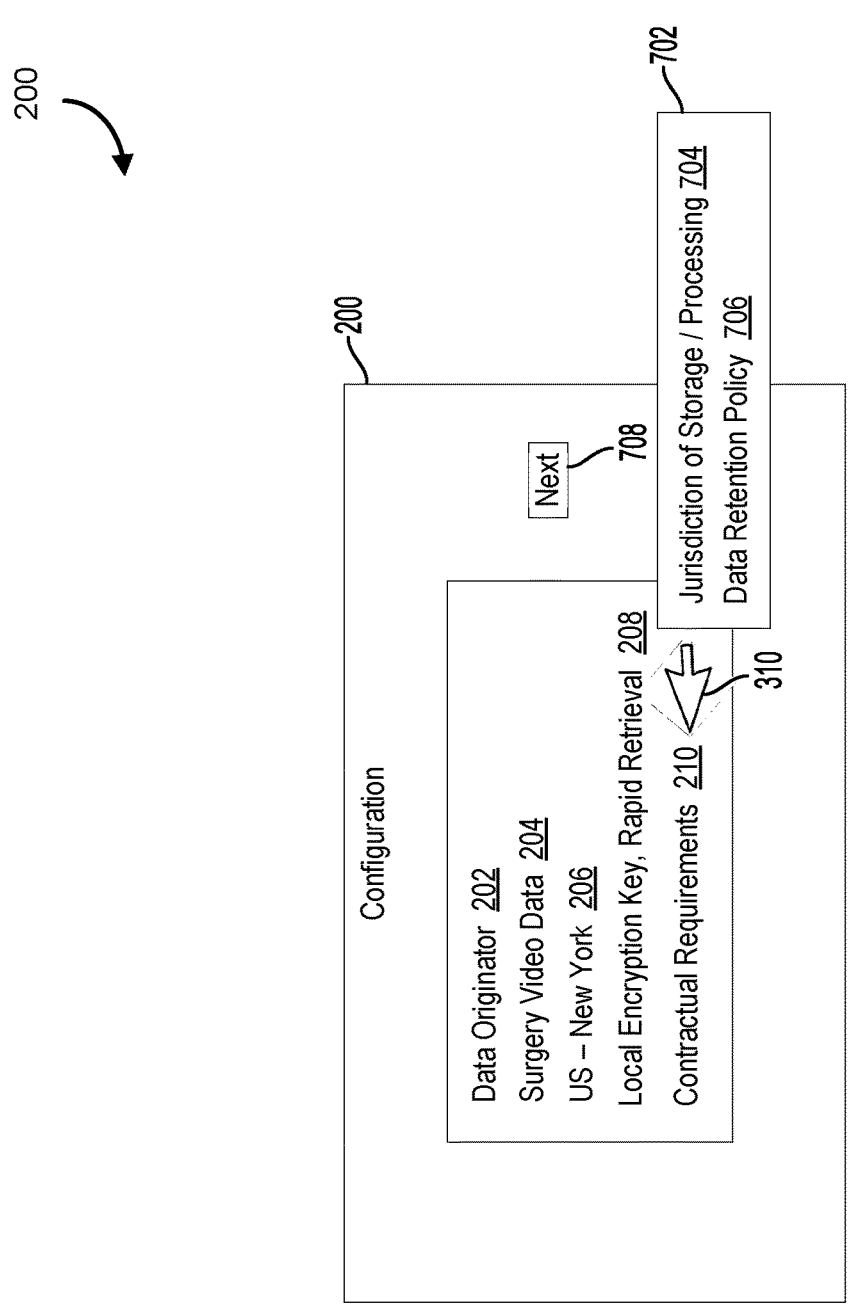

Referring now to FIG. 7, a visual representation of interface 200 for configuring de-identification of clinical data which may be presented upon user selection of contractual requirements user interface element 210 is shown.

As shown inn FIG. 7, interface generator 114 detects user selection of user interface element 210, and in response, updates interface 200 to include the linked interface 702. The fifth interface 702 may include a plurality of de-identification requirement identifiers applicable to at least one compliance regime of a plurality of compliance regimes. The compliance regime may be an insurer associated contractual requirement (e.g., a set of terms imposed by a large insurer), a contractual obligation associated with a health network or beneficial owner of the clinical data (e.g., terms required by the governing body to which the hospital belongs), and so forth.

The fifth interface 702 may include user interface elements which are partially or wholly redundant with previous user interface elements (e.g., fourth interface 602), reflecting the overlapping nature of de-identification requirements. For example, the fifth interface 702 may be used to identify contractual de-identification requirements, whereas other interfaces may be used to identify legislative de-identification requirements.

Similar to linked interface 302, the linked interface 702 includes one or more user interface elements representative of selectable de-identification requirement identifiers associated with the user selection of the fifth user interface element 210.

In the shown embodiment, the linked interface 702 includes a jurisdiction of computer operations de-identification requirement identifier 704, and a data retention de-identification requirement identifier 706.

The jurisdiction of storage de-identification requirement identifier 704, if selected, may be used by the compliance analyzer 116 to traverse the electronic data model to identify which de-identification requirements are compatible with the compliance regime and the selected jurisdiction. For example, if the processed clinical data is being stored in accordance with a compliance regime of a cloud service provider which uses servers located in a country other than the country where the clinical data originates (e.g., Canada), there may be additional de-identifications associated with the storage/processing jurisdiction. In another example, the jurisdiction of storage de-identification requirement identifier 704 may represent a jurisdiction in which data must be stored/processed based on a contractual relationship. For example, a contract with an umbrella health service provider may require or prohibit storing processed or unprocessed clinical data across state lines.

Similar to the user interface elements of interface 602, the data retention de-identification requirement identifier 706, if selected, may be used by the compliance analyzer 116 or the interface generator 114 to traverse the electronic data model to identify which de-identification requirements are applicable to the compliance regime requirements for data retrieval. For example, if the processed clinical data is being stored with a cloud service provider, the de-identification requirements may include rudiments for a certain amount of redundant back-ups be used to account for storage failure.

In some embodiments, for example, the interface 200 may further include a default user interface element, which enters as a user selection the de-identification requirement identifiers which are the most stringent, thereby ensuring the de-identification requirements are satisfied. For example, if the California rules pertaining to de-identification are the strictest, a default user interface element may apply de-identification identifiers which comply with Californian requirements.

Interface 200 may include a next user interface element 708 for progressing to a subsequent interface for configuring a de-identification system.

In some embodiments, depending on the selections made by the user in previous interfaces, one or more user interface elements may be either shown as being unavailable, or removed from the respective interface. For example, user selection associated with any one of interfaces 302, 402, and 502, may be processed by the compliance analyzer 116 to determine that the remote encryption key storage de-identification requirement identifier 606 does not comply with existing de-identification requirements associated with the previously selected user interface elements. As a result, the remote encryption key storage de-identification requirement identifier 606 may be shown as unavailable (e.g., greyed out, not capable of being selected, etc.), or the interface 602 may not be populated with the remote encryption key storage de-identification requirement identifier 606.

Figure 8:
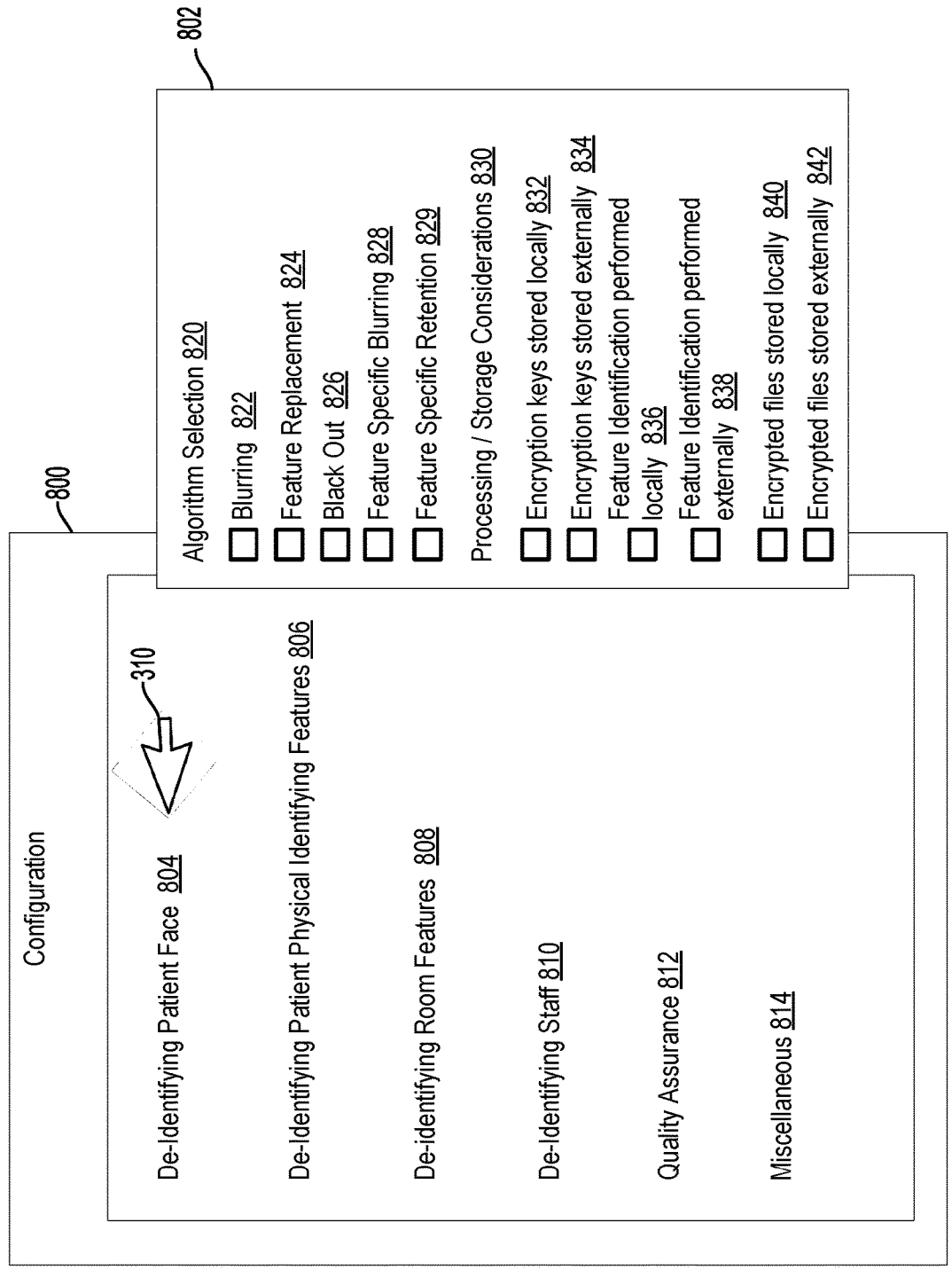
FIG. 8, FIG. 9, FIG. 10, FIG. 11, FIG. 12, FIG. 13, FIG. 14, FIG. 15, and FIG. 16 each is a visual representation of an interface for selecting operating parameters of the de-identification system of FIG. 1A, in accordance with an embodiment.

Referring now to FIG. 8, an example visual representation of interface 800 for selecting operating parameters is shown.

In some embodiments, the interface generator 114 populates the interface 800 by determining one or more operating parameters responsive to the subset of de-identification requirements associated with the user selected de-identification identifiers and populating the interactive user interface 800 with the determined one or more operating parameters. According to an example, the interface 800 may be shown as a result of the user navigating the interface 200, and selecting next user interface element 708, and the interface 800 may be automatically populated with one or more operating parameters responsive to the previous selection of de-identification requirement identifiers. According to some embodiments, for example, the interface 800 is shown in response to the interface generator 114 receiving only one identifier of one or more jurisdictions (e.g., NY), and includes one or more user interface elements representative of selectable de-identification requirement identifiers associated with the identified jurisdiction.

In some embodiments, in response to user selection of one or more de-identification identifiers of an interface generated by the interface generator 114 (e.g., user selection of the jurisdiction), the configuration data generator 118 may generate a configuration data structure which is required for said one or more de-identification identifiers, without further input from the user. For example, in response to user selection of any jurisdiction in the US, the configuration data generator 118 may generate the configuration data structure which complies with all US laws, without providing the user with further ability to enter additional operating parameters or de-identification identifiers.

In some embodiments, the interface 800 may be shown without the user navigating a previous interface (e.g., interface 200). For example, the interface generator 114 may populate interface 800 with one or more user interface elements representative of every available operating parameter.

User selection of the user interface elements can be interpreted by the compliance analyzer 116 to either determine de-identification requirements, or to determine whether de-identification requirements are complied with or satisfied, or to provide further information to a user. In response to compliance analyzer 116 determining the user selection confirms with the de-identification requirements associated with the identifiers, the user selected operating parameters are used by the configuration data generator 118 to generate configuration data structures.

In the shown embodiment, the interface 800 includes features associated with a patient, such as a patient face de-identifier interface element 804, a patient physical feature de-identifier interface element 806, features associated with the environment, such as a room feature de-identifier interface element 808, and features associated with individuals either providing care, or associated with the care being provided to the patient, such as a staff de-identifier interface element 810. The interface 800 also includes a miscellaneous interface element 812, which can be used to allow for user selection of general de-identification requirements (e.g., removal of metadata.

The interface 800 is also shown as including linked interface 802, as a result of a user selection of the patient face de-identifier interface element 804. As shown, interface 802 may include a variety of selectable operating parameters for the de-identification system associated with obscuring faces. For example, the interface 802 includes algorithm operating parameters 820, which impact the way in which clinical data is de-identified, and processing/storage operating parameters 830, which allow for the user to select desired computing processes.

In the shown embodiment, the available algorithm operating parameters 820 include a selectable blurring algorithm 822, which may be used to generate a configuration data structure which causes the de-identification device 110 to blur the entire face of identified individuals. For example, the blurring may include transposing pixels, removing pixels, adding noise pixels, or other blurring technics.

A selectable feature replacement algorithm 824 may be used to generate a configuration data structure which causes the de-identification device 110 to replace an identified face (or other identified feature) with another representation. For example, an identified face can be replaced with a cartoon face, a mask image, and so forth. Similarly, an identified voice can be replaced with a modified voice (e.g., modified in pitch, cadence, etc.).

A selectable black out algorithm 826 may be used to generate a configuration data structure which causes the de-identification device 110 to replace an identified face with an opaque, or semi transparent bounding box. For example, the bounding box may be a square, and the black out algorithm may detect the bounding box, and fill the detected bounding box with a black or other opaque color.

A selectable feature specific blurring algorithm 828 may be used to generate a configuration data structure which causes the de-identification device 110 to blur a user input facial feature, as opposed to the entire face.

Similarly, selectable feature specific retention algorithm 829 may be used to generate a configuration data structure which causes the de-identification device 110 to preserve a particular facial feature, as opposed to blurring the feature. For example, where the user input is indicative of requiring the users eyes to remain visible (not shown), the selectable feature specific retention algorithm 829 may be used to ensure that a user's eyes are not de-identified.

Selectable operating parameters may be used in conjunction with other operating parameters. For example, the selectable feature specific retention algorithm 829 may be used in conjunction with the black out algorithm 826, wherein most of a users face, aside from the specific feature of selectable feature specific retention algorithm 829, is blacked out. Multiple variants of various operating parameters are contemplated.

The processing/storage operating parameters 830 may include a variety of selectable configuration settings for processing the clinical data.

In the shown embodiment, the processing/storage operating parameters 830 include a local encryption storage setting 832, which may be used to generate a configuration data structure which causes the de-identification device 110 to store encryption keys to encrypted clinical data with the computing device to which it is installed. For example, encryption key associated with encrypted clinical data may, as a result of the configuration data structure, be stored on a client device 104 upon which the configuration data structure is installed or operated.

Similarly, a remote encryption key storage setting 834, may be used to generate a configuration data structure which causes the de-identification device 110 to store encryption key data associated with encryption of clinical data other than with the computing device on which the configuration data structure is installed on. For example, the configuration data structure may specify a transmission location where the clinical data is stored.

The local processing setting 836, may be used to generate a configuration data structure which causes the de-identification device 110 to process clinical data (e.g., process with the algorithms selected via algorithm operating parameters 820) locally (e.g., at the same location, within the same network, or the like). For example, processing clinical data to de-identify the data, as a result of the configuration data structure, occur on a client device 104.

Similarly, the external processing setting 838, may be used to generate a configuration data structure which causes the de-identification device 110 to process clinical data remotely (e.g., at another location, in the cloud, or the like). For example, the configuration data structure may specify a transmission location where the clinical data is processed.

The processing/storage operating parameters 830 may include a local storage setting 840, which may be used to generate a configuration data structure which causes the de-identification device 110 to store the encrypted or processed clinical data locally. For example, the encrypted or processed clinical may, as a result of the configuration data structure, be stored on a client device 104.

Similarly, a remote storage setting 842, may be used to generate a configuration data structure which causes the de-identification device 110 to store encrypted or processed clinical data remotely.

Figure 9:
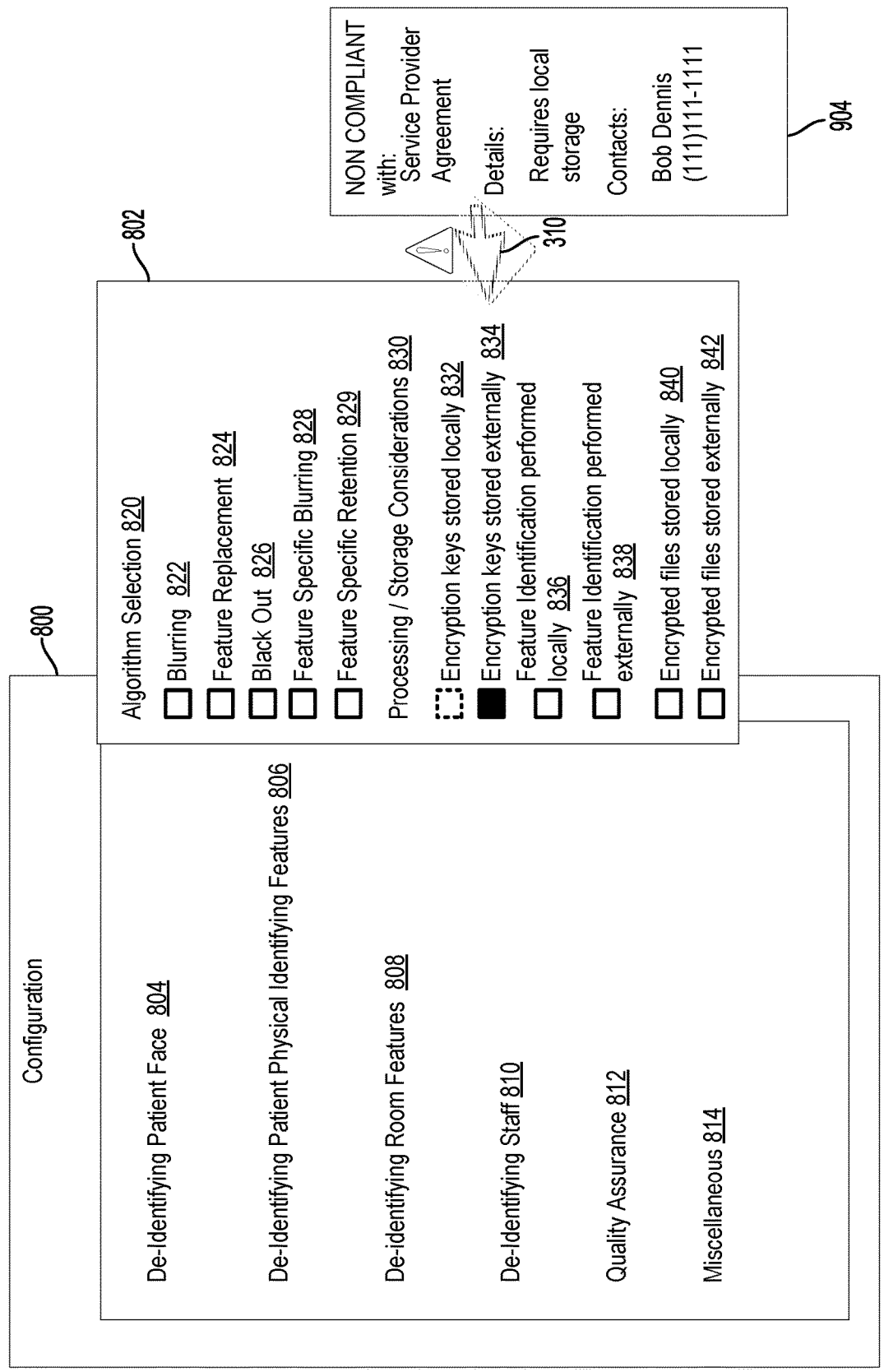

In some embodiments, user selection of a parameter, identifier or setting may impact the visual representation or availability of another parameter, identifier or setting. For example, user selection of the remote storage setting 842 may preclude the selection of a local storage setting 840, as the options may be mutually exclusive. In some embodiments, for example as shown in FIG. 9, user selection of the remote encryption key storage setting 834 may cause the interface generator 114 to update the local encryption storage setting 832 visual representation to preclude user selection by indicating, via dotted lines, that the local encryption storage setting 832 is not available.

In some embodiments, the compliance analyzer 116, in response to receiving a user selection of at least one of the operating parameters (e.g., anyone of processing/storage operating parameters 830 or algorithm operating parameters 820), analyses the user selection for conformity with the subset of de-identification requirements.

In response to determining the user selection conforms with the subset of de-identification requirements, the compliance analyzer 116 may instruct the interface generator 114 to modify the interactive user interface (e.g., interface 800) to provide a visual indicator of the conformity. For example, the interface generator 114 may modify the interface 800 to include a checkmark (not shown) or other indication of positive compliance.

In response to determining the user selection conforms to the subset of de-identification requirements, the data configuration generator 118 may generate a configuration data structure including data reflective of the user selected operating parameters. For example, the configuration data structure may specify a particular recognition algorithm and a particular obscuring algorithm to be applied by the de-identification system.

The configuration data structure may be a data structure as follows:

```
[deid]
head=1
body=1
audio=1
laparoscopic=0
[data]
batch_size_head=16
batch_size_body=4
batch_camera=512
[interpolation]
sample=5
```

```
[head_blur]
confidence_score=0.5
blur_ratio=99
track_supplement=4
track_squeeze=2.0
blur_squeeze=1.0
[body_obfuscate]
confidence_score=0.3
smoothing=7
alpha=1.0
label=0,1
label_name=surgical,patient
adaptive_threshold_max_value=255
adaptive_threshold_block_size=5
adaptive_threshold_constant_subtraction_size=5
bilateral_dim=5
bilateral_sigma_color=500
bilateral_sigma_space=500
surgical_tint_red=167
surgical_tint_green=210
surgical_tint_blue=225
patient_tint_red=183
patient_tint_green=111
patient_tint_blue=255
[audio_pitch]
non_voice_filter=0
filter_cut_off_frequency=5000
semitone=3
[camera_view_classify]
label=0,1
label_name=External, Internal
image_width=224
image_height=224
smoothing=15
blacken_threshold=0.7
[head_model]
model=head/model_final.pth
config=head/config.yaml
[body_model]
model=body/model_final.pth
config=body/config.yaml
[camera_view_model]
model=camera_view/ConvModel.py
weights=camera_view/MCEVC_epochs_5_quick_pass.pth
```

In the example configuration data structure, the configuration structure includes a deid portion associated with whether audio-video data reflective of the head or body of an individual are to be de-identified, along with a binary value indicating whether said de-identification needs to be performed (e.g., head=1, body=1, where 1=perform de-identification, 0=no de-identification required).

In the example shown, the de-identification requirements are set out separately for separate audio-video, audio, and video data streams. For example, laparoscopic video data is treated as a separate audio-video data stream with distinct de-identification requirements as compared to the de-identification requirements of other collected video data.

The data portion of the example configuration data structure may be used to configure the batch size for running de-identification algorithms. In the example shown, the data tab describes the number of video frames processed by the relevant de-identification algorithm at the same time. The parameters within the data portion may impact, or be impacted by the Central Processing Unit (CPU)/Graphics Processing Unit (GPU)/memory capacity, and can have an influence on the running speed of the de-identification algorithms. In the shown embodiment, the three parameters define the batch size to various de-identification algorithm components.

The interpolation portion of the example configuration data structure may be used to configure a sampling rate of the pixels within the visual component of the audio-visual data. For example, a low interpolation rate may allow for a more accurate identification of whether pixels within the video data correspond to facial features, which may preserve larger portions of the video data (as opposed to obscuring same) at the expense of processing speed.

The head blur portion of the example configuration data structure may be used to configure parameters of the head obscuring algorithm. For example, the confidence score parameter may be used as a threshold for determining whether a detected object in the frame is a head, and may be based on an expected or predicted false positive rate of falsely identifying objects as heads. The blur ratio parameter may be used to modify the extent of the blurring being performed on detected head objects by the head obscuring algorithm. The supplement parameter may be used to extend or generate a trajectory associated with each detected head based on the beginning and end location of each head tracked by the head obscuring algorithm. The supplement parameter may increase the accuracy of the head detection as a result of generating expected locations of a head. The squeeze metric parameter may be used to configure how and how much of the blurring region is reshaped.

The body obfuscate portion of the example configuration data structure may be used to configure parameters of the obscuring algorithm which identify bodily features and algorithms which obscure bodily features. For example, the parameters may describe marking identified body parts with different features (e.g., the tint features described in the example configuration portion), and various other operational parameters.

The audio pitch portion of the example configuration data structure may be used to configure parameters of the obscuring algorithm which identify audio and algorithms which obscure audio. For example, the parameters may describe the whether the audio will use a known voice filter (e.g., no voice filter parameter), and parameters to remove noise which cannot be human generated (filter cut off frequency), and so forth.

The camera view classify portion of the example configuration data structure may be used to configure parameters of the obscuring or identifying algorithms which identify/obscure features in the video data. For example, the first eight parameters (e.g., confidence_score, smoothing, alpha, label, label_name, adaptive_threshold_max_value, adaptive_threshold_block_size, adaptive_threshold_constant_subtraction_size) can be used to define or modify how an edge of a body is determined or represented. Alternatively stated, the first eight parameters may be used for edge-based modification. The remaining parameters may be used to set colours which are used to represent the detected features, or allow for colour changing.

The head model portion, body model portion and camera view model portion of the example configuration data structure may be used to configure parameters indicative of which type of obscuring or identifying algorithm is used to de-identify the audio-video data. For example, the previous parameters may be indicative of a first algorithm, and the head model portion, body model portion and camera view model portion may store information associated with locating the particular model in memory.

Figure 10:
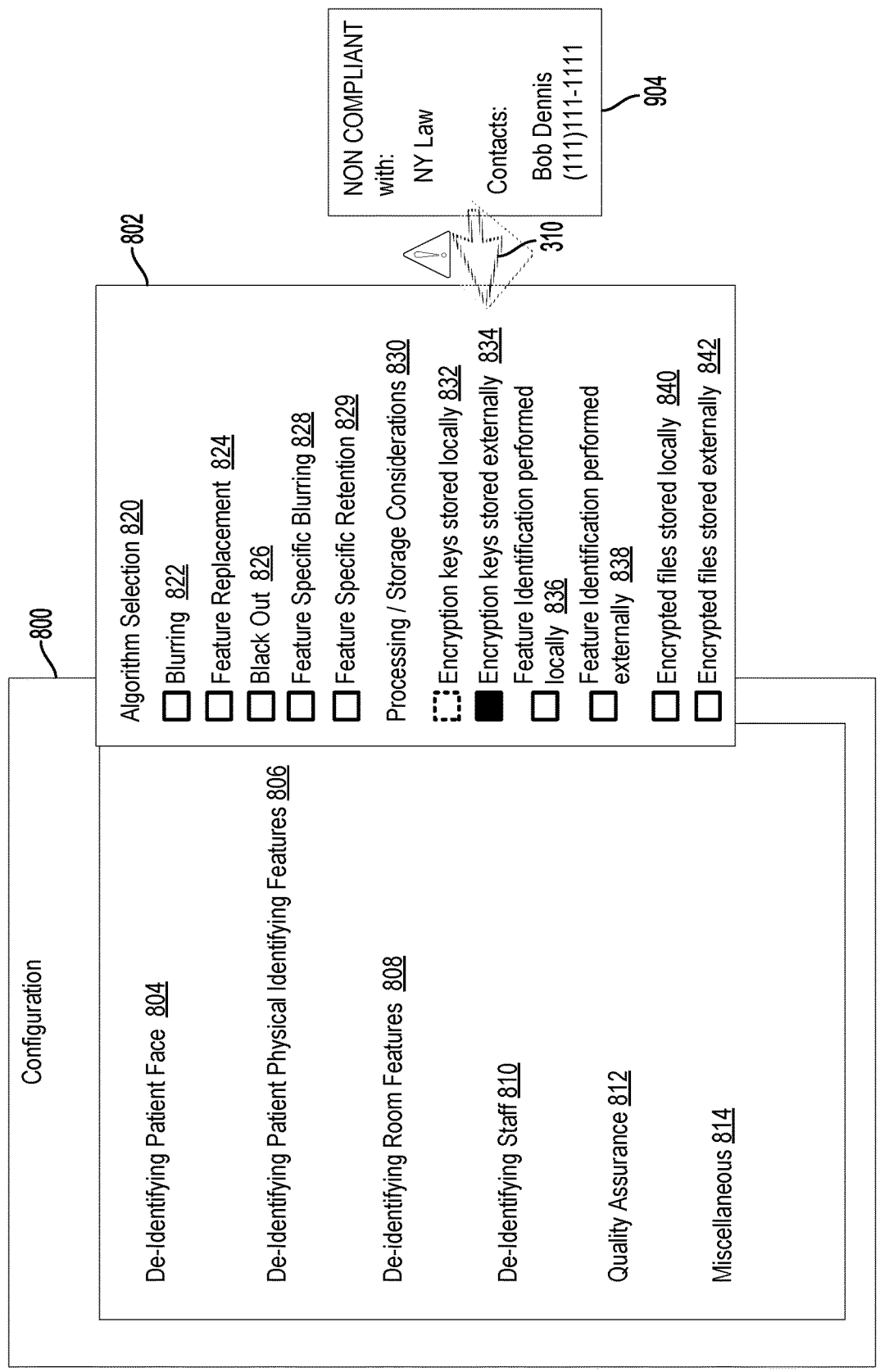

In some embodiments, in response to determining the user selection does not conform with the subset of de-identification requirements (e.g., the user selected algorithm type does not confirm to the subset of de-identification requirements, or the user selected external encryption storage setting does not confirm to the subset of de-identification requirements, etc.), the compliance analyzer 116 may instruct the interface generator 114 to modify the interactive user interface (e.g., interface 800) to provide a visual indicator (e.g., a warning visual indicator) of the non-conformity. For example, referring to FIGS. 9 and 10, the interface generator 114 may modify the user navigation tool 302 to include a warning visual indicator (e.g., the shown caution sign). In FIG. 10, the interface generator 114 is shown modifying the selectable checkbox of remote encryption key storage setting 834 so that the user is unable to select said checkbox. Various visual indicators of nonconformity are contemplated.

Figure 11:
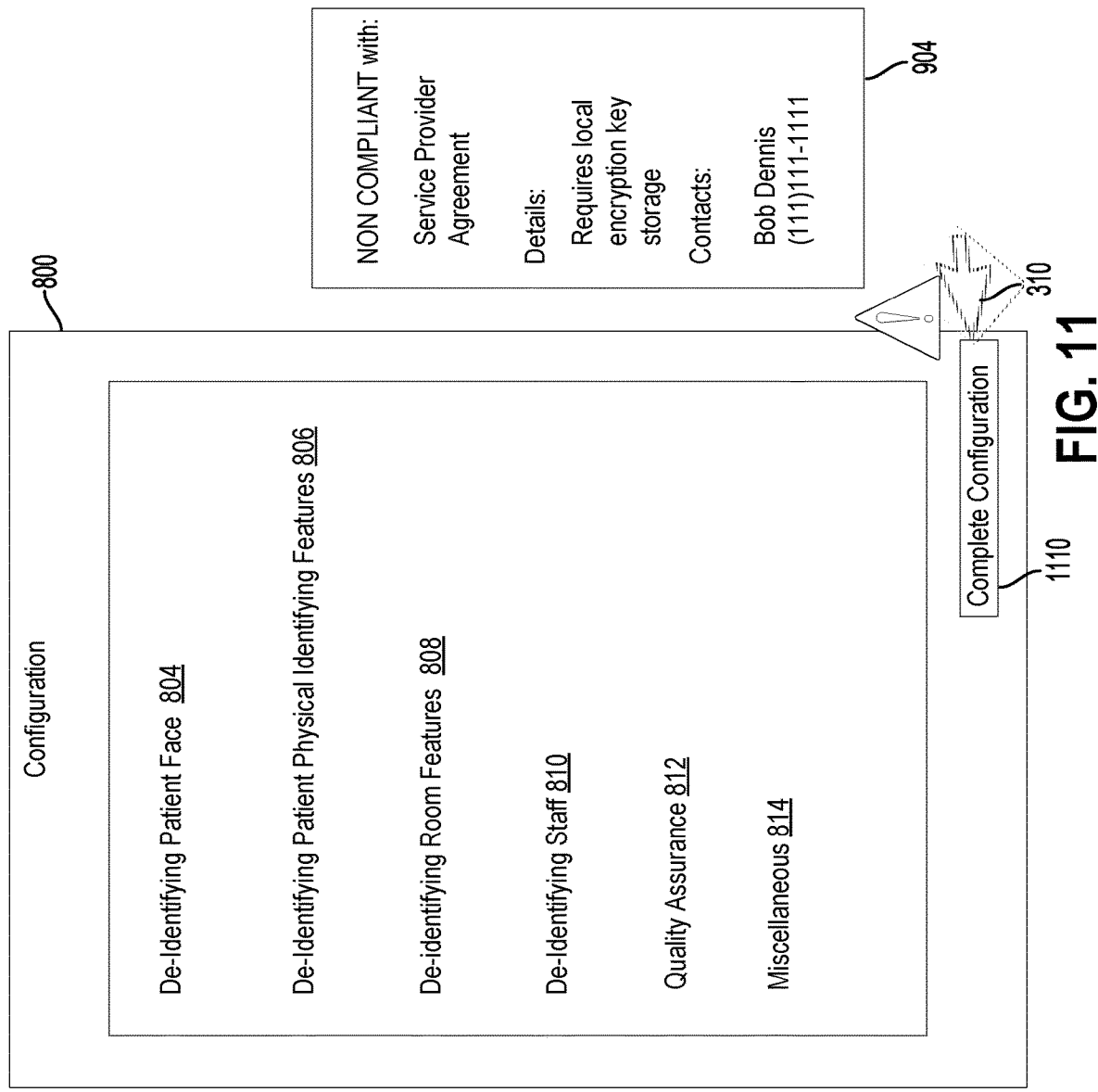

The compliance analyzer 116 may instruct the interface generator 114 to modify the interactive user interface (e.g., interface 800), in response to determining the user selection does not conform to the subset of de-identification requirements, to include an information panel 904 linked with the nonconforming selection. For example, as shown in FIGS. 9-11, information panel 904 may be located within the proximity of the user navigation tool 310. In some embodiments, information panel 904 covers the entire interface 800. Various locations and shapes of information panel 904 are contemplated.

The information panel 904 may include one or more details associated with the determined nonconformity. In the shown embodiment in FIG. 9, the information panel provides which de-identification requirement the user selection is not compatible with, a suggested operating parameter which is compliant with the de-identification requirements, and contact information associated with the relevant de-identification requirements and were operating parameter. Various amounts of details are contemplated to be shown with information panel 904. For example, in the embodiment shown in FIG. 10, the information panel 904 provides a source of the noncompliance and the contact details, without suggestions.

In some embodiments, for example, the information panel 904 and the visual indicator of nonconformity appear during a finalization or last step before a configuration data structure is generated. For example, in the embodiment shown in FIG. 11, the user is informed of nonconformity as a result of attempting to select a configuration completion button 1110.

Figure 12:
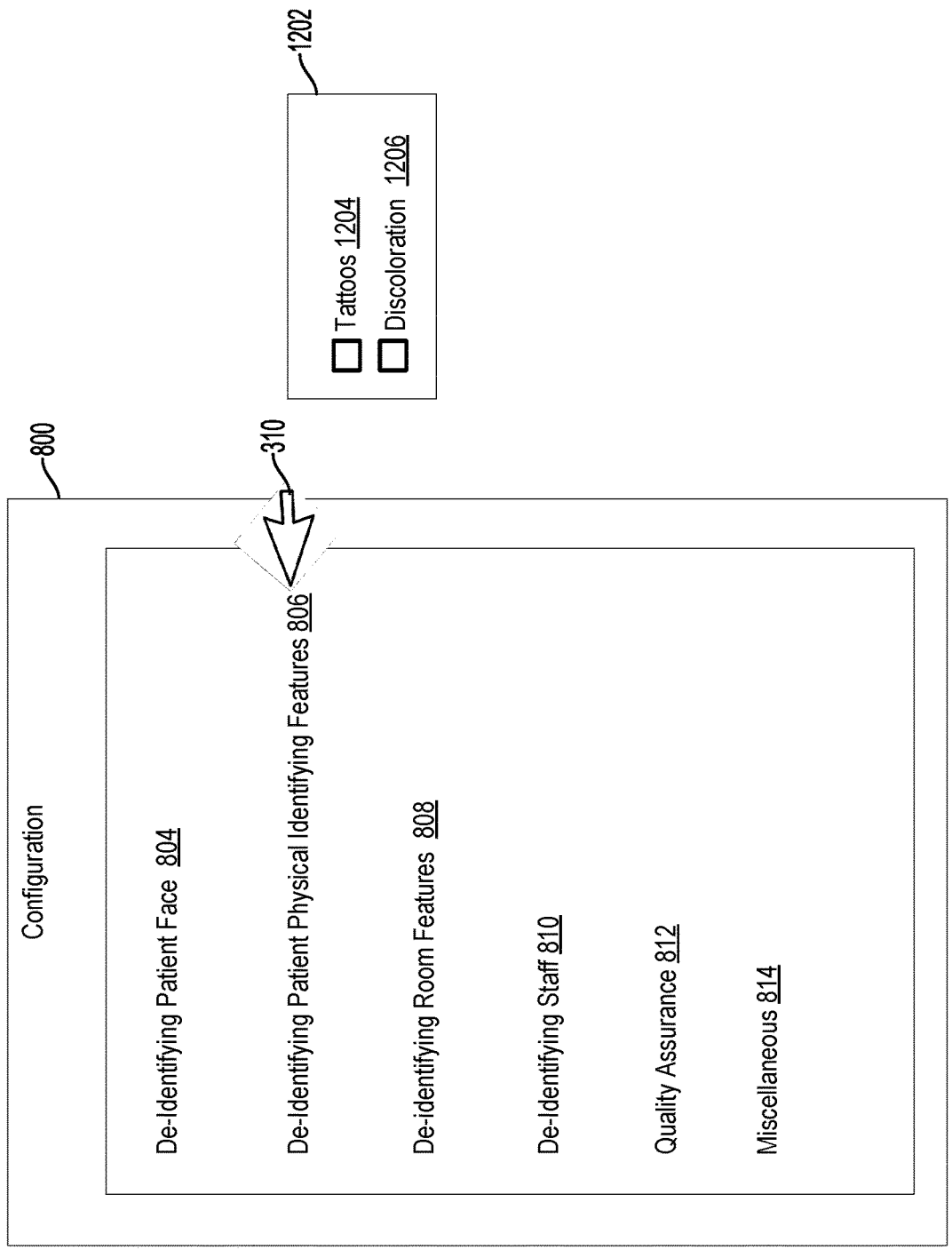

FIG. 12 includes a visual representation of interface 800 for configuring de-identification of audio video data which may be presented when user selection of a patient physical feature de-identifier interface element 806 is detected.

In response to the interface generator 114 detecting user selection of patient physical feature de-identifier interface element 806, the interface generator 114 updates the visual representation 200 with linked interface 1202. Interface 1202 may include various patient physical feature parameters, such as, for example, a tattoo parameter 1204 and a discoloration parameter 1206.

For example, the tattoo parameter 1204, if selected, may be used to generate a configuration data structure which causes the de-identification device 110 to detect and obscure detected tattoos of a patient, or employee, which may inadvertently disclose personal information. For example, the detected tattoo can be replaced with a cartoon image, or blurred, and so forth.

For example, the discoloration parameter 1206, if selected, may cause the de-identification device 110 to operate similarly to detect and obscure moles, birthmarks, or other identifying features, such as scars, burn marks, etc.

Figure 13:
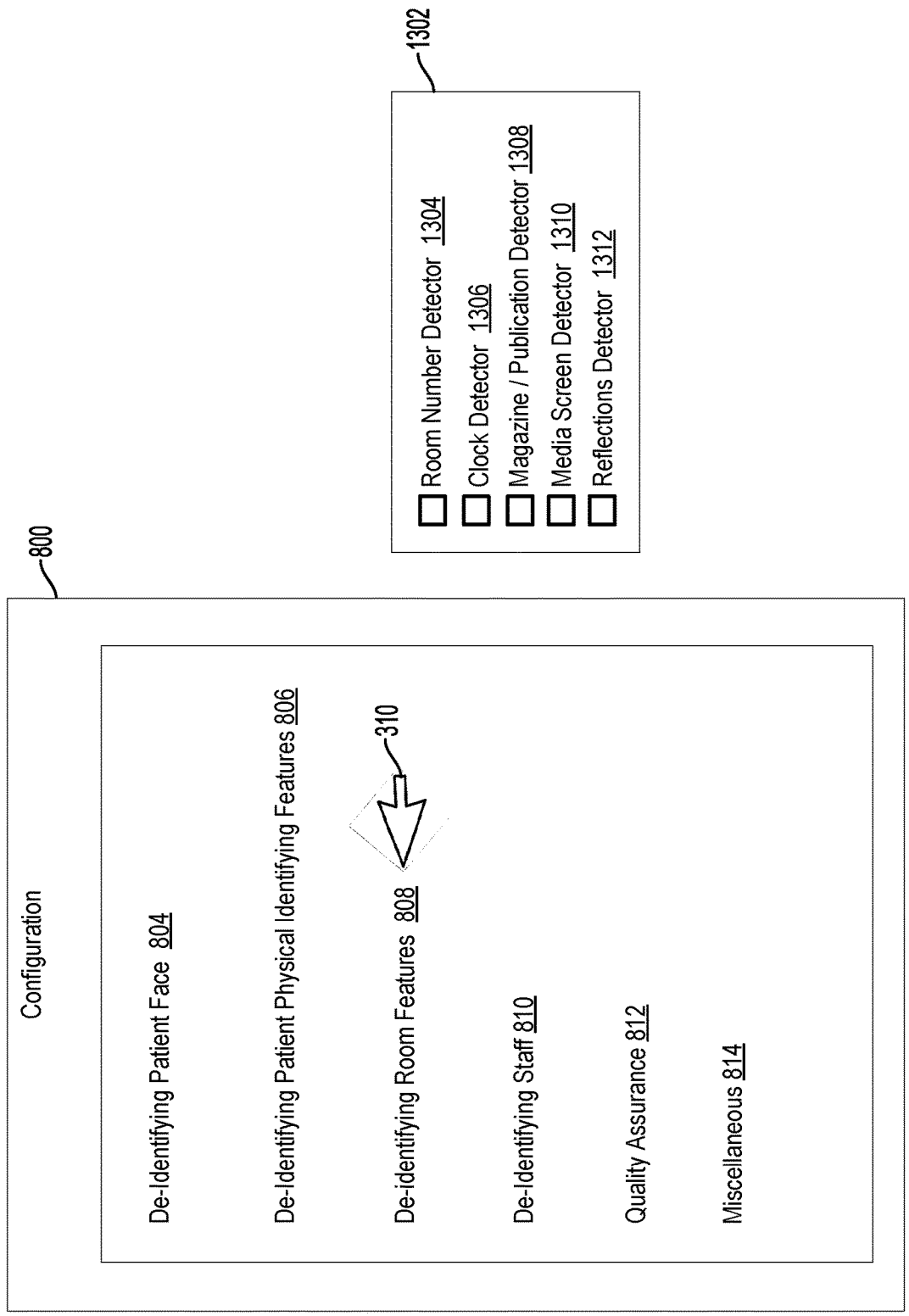

FIG. 13 includes a visual representation of interface 800 for configuring de-identification of clinical data which may be presented when user selection of a room feature de-identifier interface element 808 is detected.

In response to the interface generator 114 detecting user selection of room feature de-identifier interface element 808, the interface generator 114 updates the visual representation with linked interface 1302. Interface 1302 may include various room feature parameters, such as, for example, a room number detector parameter 1304, a clock detector parameter 1306, a publication detector parameter 1308, a screen detector parameter 1310, and a reflections detector 1312.

The room number detector parameter 1304, if selected, may be used to generate a configuration data structure which causes the de-identification device 110 to detect and obscure detected room numbers, which may inadvertently disclose personal information. For example, an identified room number can be replaced with a cartoon image, or blurred, and so forth.

The clock detector parameter 1306, the publication detector 1308, the screen detector parameter 1310, and the reflections detector parameter 1312, if selected, may cause the de-identification device 110 to operate similarly to detect and obscure clocks, publications (e.g., newspapers, magazines, or the like), screens (e.g., mobile device screens, televisions, clinical device screens, computer screens, monitors, or the like), and reflections (e.g., features of patients, staff, or other individuals in reflective surfaces such as windows or screens), respectively.

Figure 14:
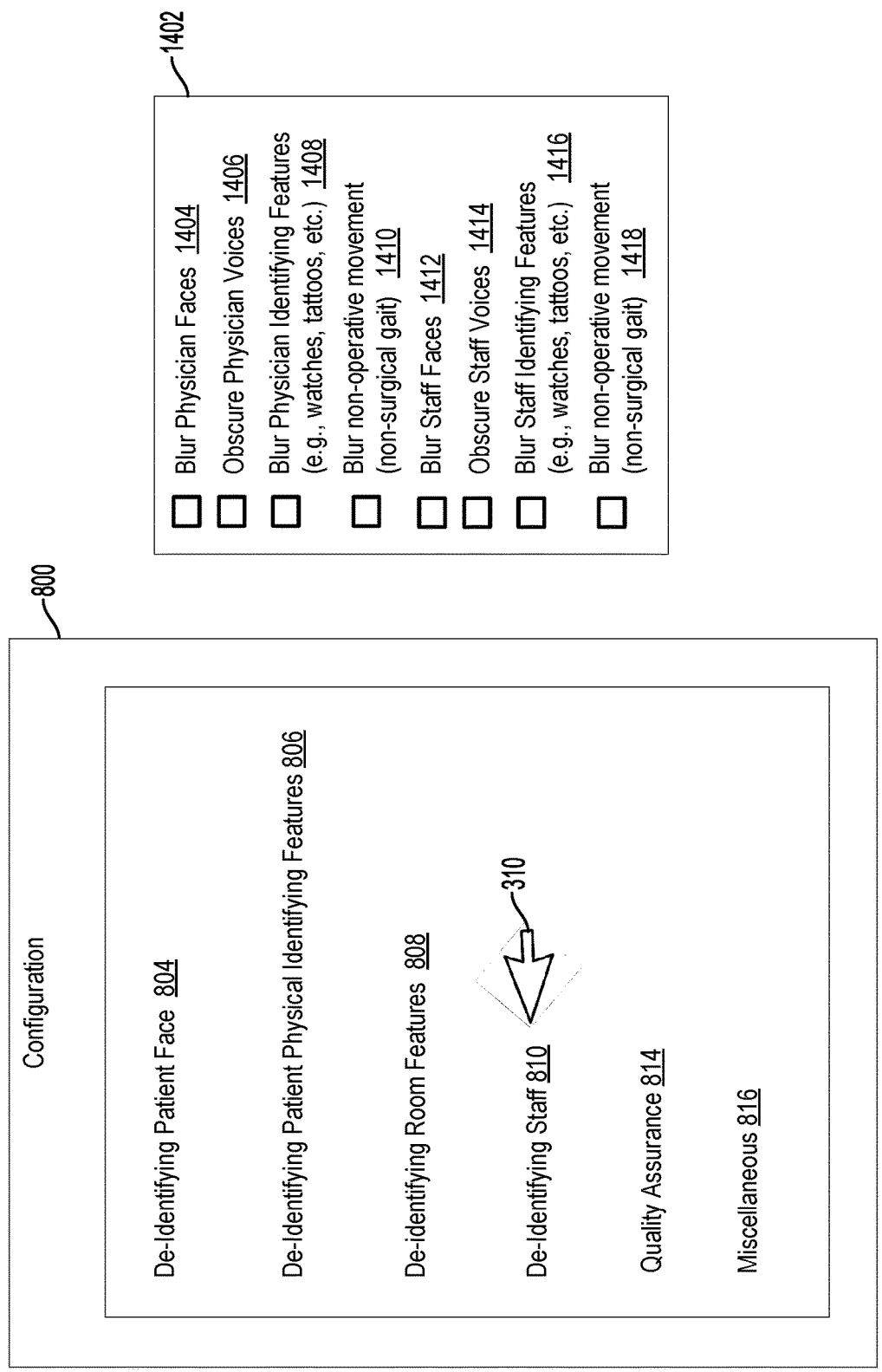

FIG. 14 includes a visual representation of interface 800 for configuring de-identification of audio video data which may be presented when user selection of a staff de-identifier interface element 810 is detected.

In response to the interface generator 114 detecting user selection of the staff de-identifier interface element 810, the interface generator 114 updates the visual representation with linked interface 1402. Interface 1402 may include various staff de-identification parameters such as, for example, a physician facial feature obscuring parameter 1404, a physician audio feature obscuring parameter 1406, a physician physical feature obscuring parameter 1408, physician movement feature obscuring parameter 1410, and similarly a staff facial feature obscuring parameter 1412, a staff audio feature obscuring parameter 1414, a staff physical feature obscuring parameter 1416, and a staff movement feature obscuring parameter 1418.

For example, the physician facial feature obscuring parameter 1404, if selected, may be used to generate a configuration data structure which causes the de-identification device 110 to detect and obscure detected physician faces. The physician audio feature obscuring parameter 1406 may similarly be used to generate a configuration data structure which causes the de-identification device 110 to detect and obscure physician voices, by, for example, distorting the cadence, pitch or tone of the audio data.

The physician physical feature obscuring parameter 1408, and the physician movement feature obscuring parameter 1410, if selected, may cause the de-identification device 110 to operate similarly to generate a configuration data structure which detects and obscures physician features (e.g., tattoos, marks, etc.), and personally identifying features which are motion based (e.g., a gait, distinctive hand gesture, etc.), respectively.

The user selection of the staff facial feature obscuring parameter 1412, the staff audio feature obscuring parameter 1414, the staff physical feature obscuring parameter 1416, and the staff movement feature obscuring parameter 1418 may generate similar respective configuration data structures with the physician associated parameters, but for staff members (e.g., nurses, assistants, support staff, equipment technicians, etc.)

Figure 15:
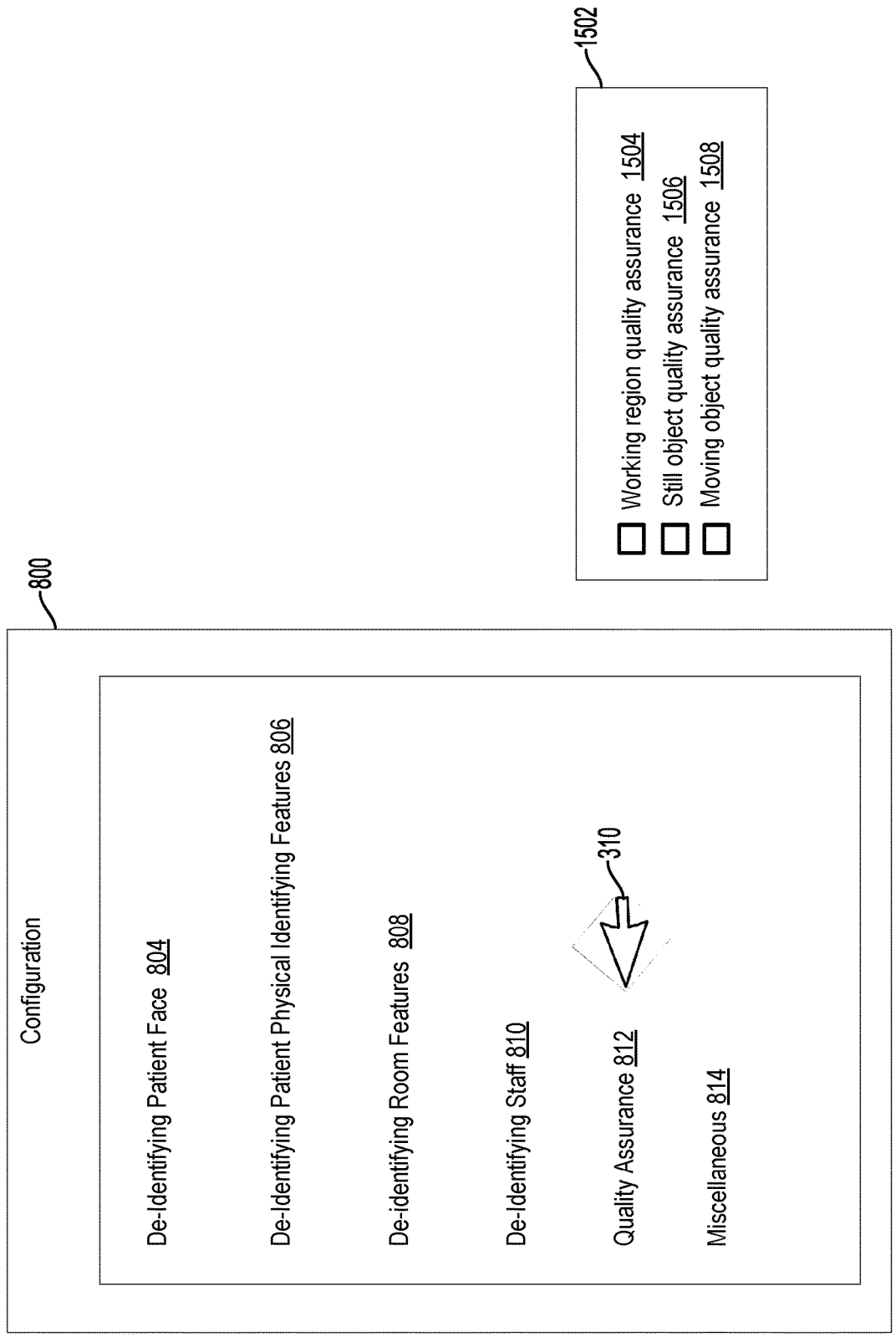

FIG. 15 includes a visual representation of interface 800 for configuring de-identification of audio video data which may be presented when user selection of a quality assurance interface element 814 is detected.

In response to interface generator 114 detecting user selection of the miscellaneous interface element 816, the interface generator 114 updates the visual representation with linked interface 1602. Interface 1602 may include various quality assurance parameters such as, for example, a working region quality assurance parameter 1504, a still object quality assurance parameter 1506, and a moving object quality assurance parameter 1508.

Various parameters included within interface 1602, if selected, each cause de-identification of clinical data to invoke an associated manual quality assurance process for human review of at least a portion of the clinical data. Quality assurance may be invoked under defined circumstances, e.g., when there is failure to identify an object of interest or other error condition of an automated processing algorithm, when a computed uncertainty metric of an automated processing algorithm is higher than a pre-defined threshold, or the like. Quality assurance may be invoked for random portions of the clinical data, or for a pre-defined portion of the clinical data (e.g., at the beginning of a clinical procedure).

When a manual quality assurance process is invoked, a portion of the clinical data (e.g., a portion of a frame, a frame, or a sequence of frames, or the like) is sent to a human operator for manual review. The portion of data sent to the human operator may depend on which of the parameters of interface 1602 have been selected. The type and extent of review to be conducted by the human operator may also depend on which of the parameters of interface 1602 have been selected.

For example, the working region quality assurance parameter 1504, if selected, may be used to generate a configuration data structure which causes the de-identification device 110 to send a portion of clinical data to a human operator for manual review and identification of the working region (e.g., the region of a frame where an operation or other clinical activity of interest takes place).

For example, the still object quality assurance parameter 1506, if selected, may be used to generate a configuration data structure which causes the de-identification device 110 to send a portion of clinical data to a human operator for manual review and identification of a still object (e.g., a face, other body portion, or a room feature, or the like) within a frame. For example, the de-identification device 110 may prompt the human operator to define a frame region containing the object.

For example, the moving object quality assurance parameter 1508, if selected, may be used to generate a configuration data structure which causes the de-identification device 110 to send a portion of clinical data to a human operator for manual review and identification of a moving object (e.g., a face, other body portion, or a room feature) within a sequence of frames. For example, the de-identification device 110 may prompt the human operator to define a frame region containing the object within a first frame of a sequence and then modify the frame region for subsequent frames of the sequence if the object has moved.

Figure 16:
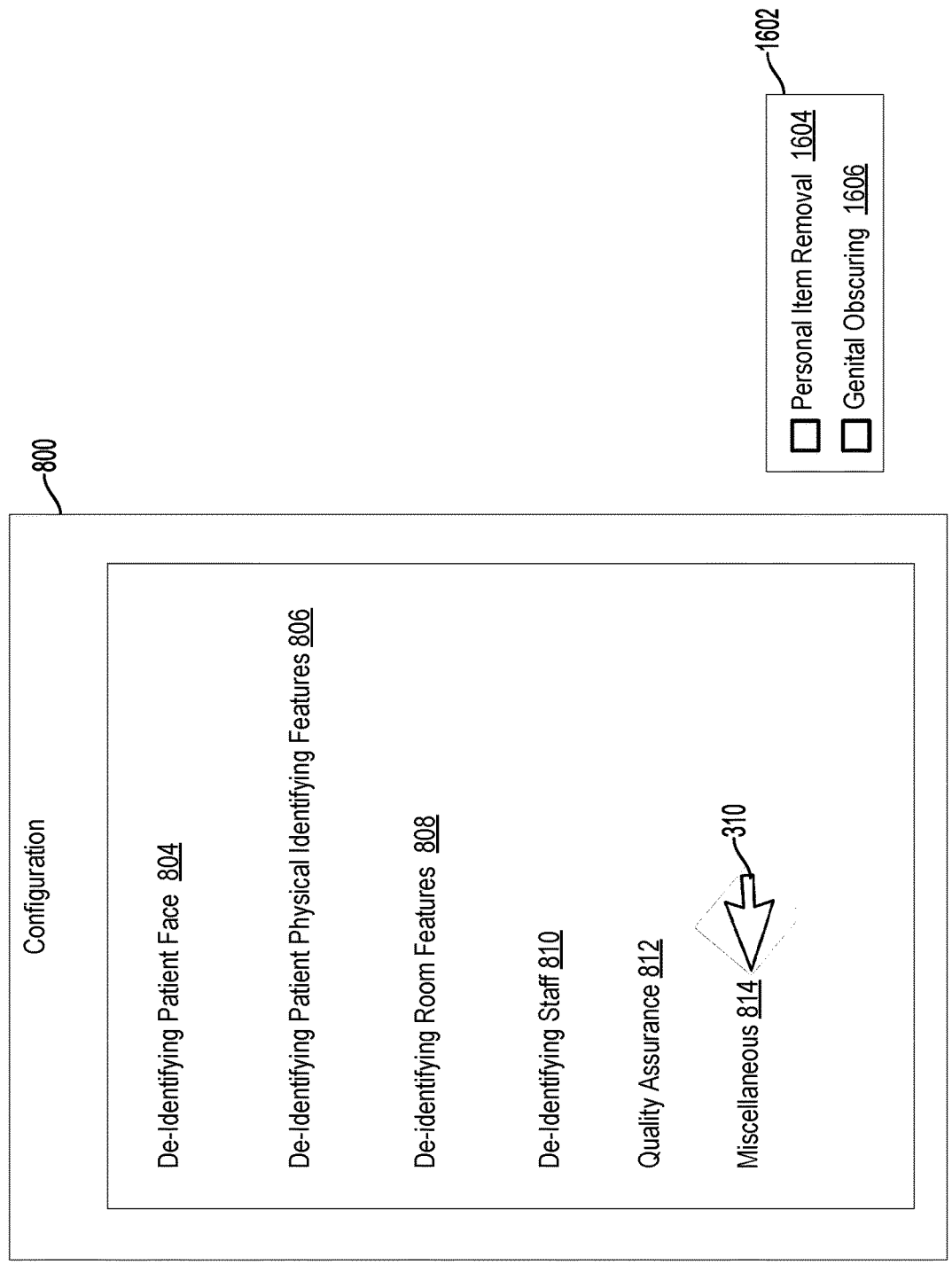

FIG. 16 includes a visual representation of interface 800 for configuring de-identification of audio video data which may be presented when user selection of a miscellaneous interface element 816 is detected.

In response to the interface generator 114 detecting user selection of the miscellaneous interface element 816, the interface generator 114 updates the visual representation with linked interface 1602. Interface 1602 may include various miscellaneous de-identification parameters such as, for example, a personal item removal parameter 1604, and a genital obscuring parameter 1606.

For example, the personal item removal parameter 1604, if selected, may be used to generate a configuration data structure which causes the de-identification device 110 to detect and obscure detected personal items, such as watches, glasses, cufflinks, and so forth.

For example, the genital obscuring parameter 1606, if selected, may be used to generate a configuration data structure which causes a de-identification system to detect and obscure genitals, regardless of whether they constitute personalized information.

In some embodiments, for example, the compliance analyzer 116 may require further information to determine whether the user selection conforms to the subset of de-identification requirements. For example, an administrator of the configuration device 102 may preclude configuring a de-identification system based on a compliance regime alone.

Where the compliance analyzer 116 requires further information, the interface generator 114 may modify the interactive user interface (e.g., interface 200 of FIG. 3) to include user interface elements or further interfaces (e.g. linked interface 402) for user input of additional operating parameters or identifiers of the de-identification system.

The compliance analyzer 116 may subsequently update the subset of the de-identification requirements by traversing the data model to determine de-identification requirements applicable to the additional identifiers.

In some embodiments, for example, the data modeller 112 may receive a request for de-identification requirements associated with an identifier for which the electronic data model has no de-identification requirements. For example, the request may include a jurisdiction identifier for which the electronic data model has no associated de-identification requirements.

In response to receiving the request for de-identification requirements associated with an identifier for which the electronic data model has no de-identification requirements, the interface generator 114 may be configured to populate the interactive interface (e.g., interface 200) with an input interface (not shown) for receiving new de-identification requirements. The input interface may, for example, be similar to the linked interfaces described herein.

The user may subsequently interact with the input interface and provide new de-identification requirements and possibly associated identifiers. For example, the user may input new contractual requirements associated with a new compliance regime, such as a new insurance contract, having new de-identification requirements, and associate the new de-identification requirements with the insurer associated with the new insurance contract. In some embodiments, the user may input new de-identification requirements associated with a jurisdiction previously unsupported by the model, such states into which the provider is expanding into, and associate the new de-identification requirements with the previously unsupported state. In a further example, the user may input new de-identification requirements representative of an updated set of de-identification requirements associated with an existing jurisdiction (e.g., a change in laws).

In response to receiving the new de-identification requirements, the data modeller 112 may update the electronic data model with the received new de-identification requirements.

The example embodiments described in the foregoing include a graphical user interface. In other embodiments, the graphical user interface may be replaced or supplemented by another suitable compute-implemented user interface such as a text-based interface, a voice-based interface, or the like.

In some embodiments, a configuration data structure generated by configuration data structure generator 118 includes a text document that can be edited to change configuration parameters, e.g., using a suitable text editor. For example, the text document may be in the form of an XML file, an INI file, or the like.

Figure 17:
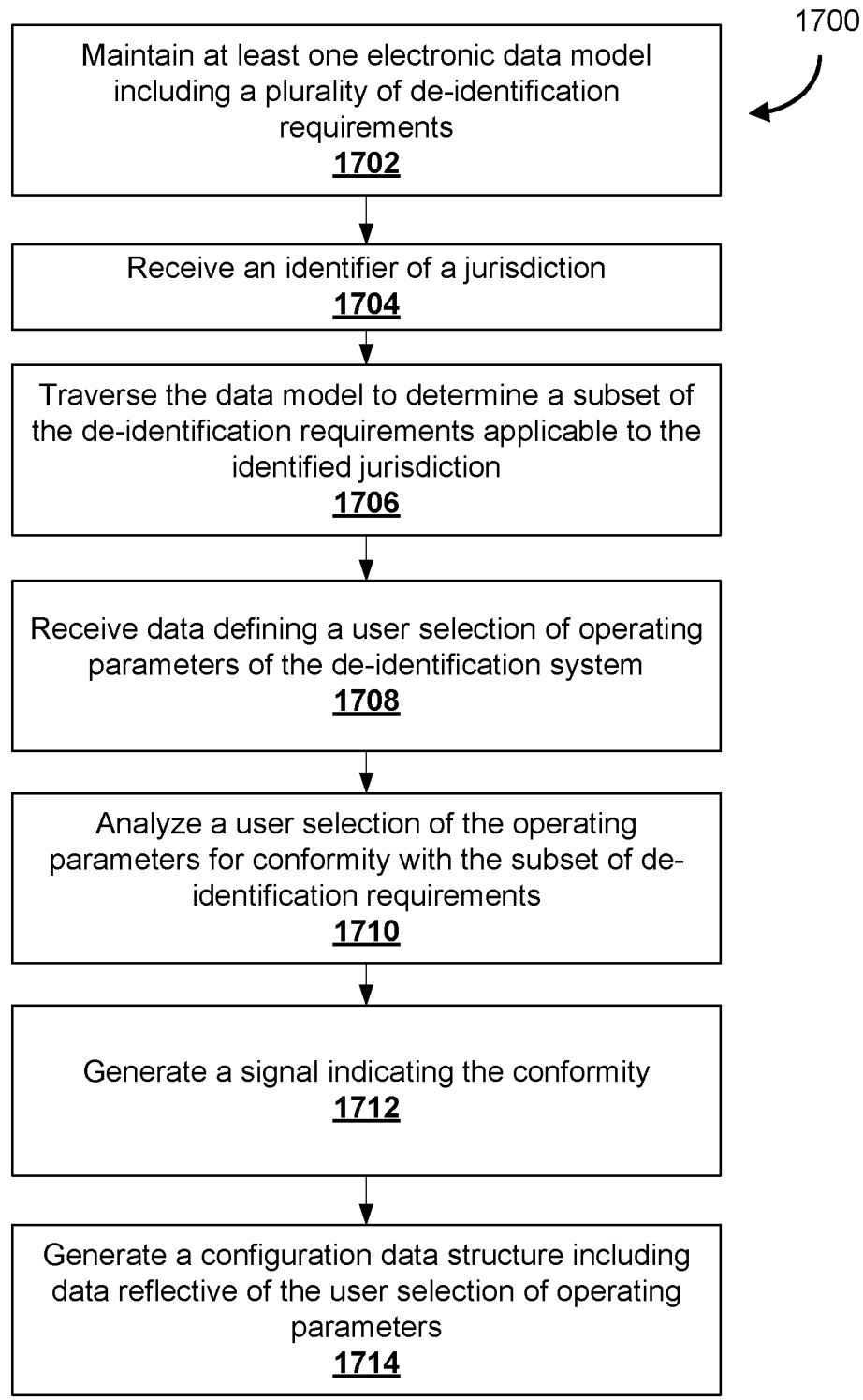
FIG. 17 is a flowchart of an example method for configuring the de-identification system of FIG. 1A, in accordance an embodiment.

FIG. 17 is a flowchart of an example method 1700 for configuring a de-identification device 102, as may be performed at a configuration device 102, in accordance with an embodiment.

At step 1702, at least one electronic data model including a plurality of de-identification requirements for removing personal information from clinical data obtained in a clinical environment is maintained. The plurality of de-identification requirements include requirements applicable to at least one jurisdiction of a plurality of jurisdictions.

At step 1704, an identifier identifying one of the jurisdictions of the plurality of jurisdictions is received. For example, the identifier may be received from interface 402 of FIG. 4.

At step 1706, the data model is traversed to determine a subset of de-identification requirements applicable to the identified jurisdiction.

At step 1708, a user selection of operating parameters of the de-identification system 100 is received.

At step 1710, the user selection is analyzed for conformity with the subset of de-identification requirements identified in step 1706.

At step 1712, conformity signal indicating the conformity is generated in response to determining the user selection conforms to the subset of de-identification requirements identified in step 1706. The signal may, for example, define a binary value reflective of whether or not there is conformity with the identified de-identification requirements. The signal may, for example, define a numerical value reflective of whether of a degree of conformity with the identified de-identification requirements. The signal may be used to generate a visual indication on a display interface, e.g., of configuration device 102.

At step 1714, a configuration data structure is generated, which configuration data structure may include data reflective of the user selection of operating parameters in step 1710.

Figure 18:
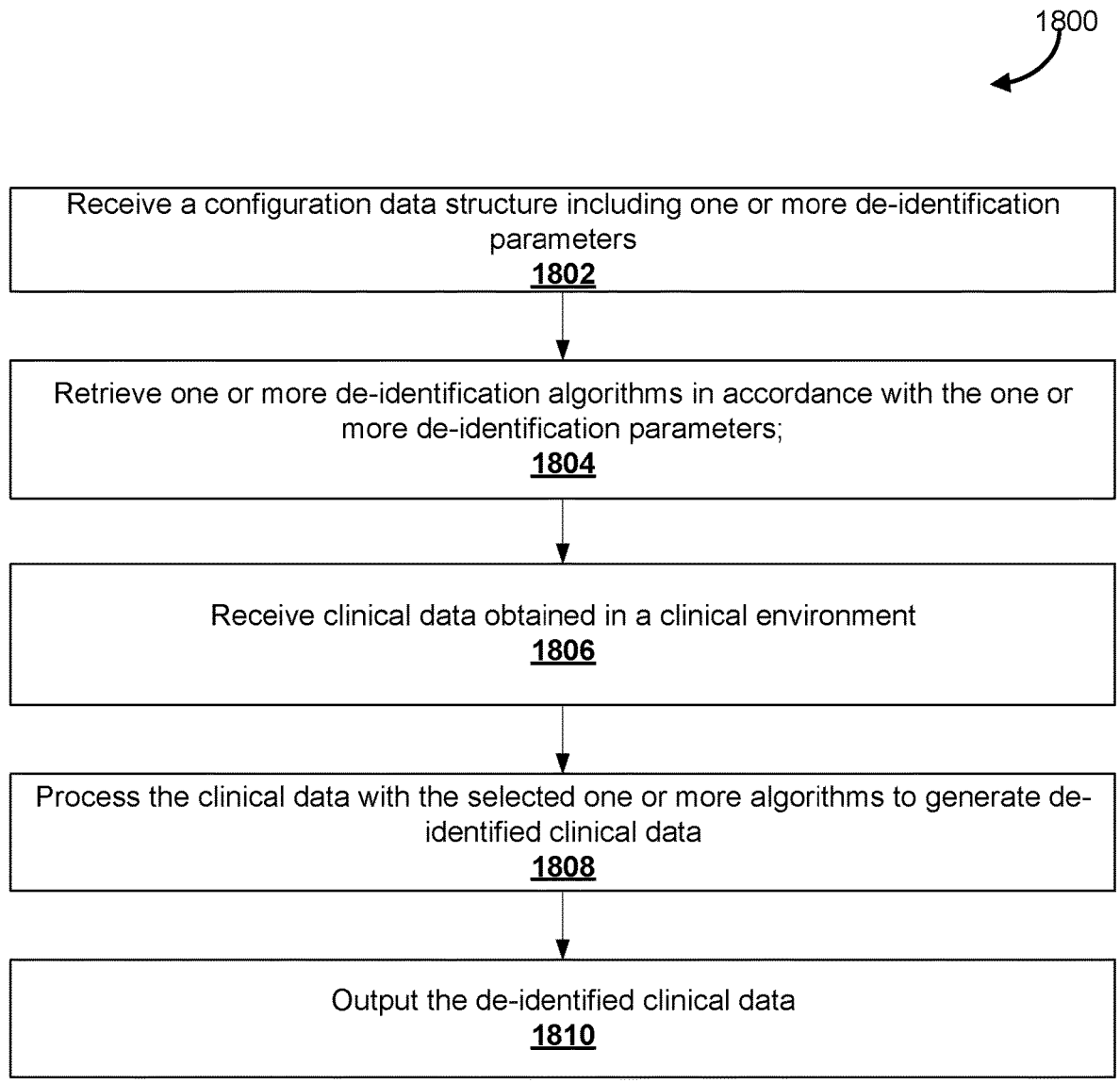
FIG. 18 is a flowchart of an example method for de-identifying clinical data, in accordance with an embodiment.

FIG. 18 is a flowchart of an example method 1800 for de-identifying personalized information, as may be performed by a de-identification device 110, in accordance with an embodiment.

At step 1802, a configuration data structure including one or more de-identification parameters is received. In some embodiments, the configuration data structure includes metadata specifying a processing algorithm, such as: a facial recognition algorithm, a tattoo recognition algorithm, a speech recognition algorithm, and so forth, and/or an obscuring algorithm such as: a blurring algorithm, a black out algorithm, a replacement algorithm, and so forth.

At step 1804, one or more processing algorithms are retrieved from a data repository (e.g., a memory of the de-identification device 110, or a data source 106) capable of processing clinical data in accordance with the one or more de-identification parameters.

According to some embodiments, for example, a plurality of processing algorithms are retrieved, including algorithms capable of processing audio-video data in accordance with the one or more de-identification parameters are selected from the retrieved plurality of recognition algorithms and plurality of obscuring algorithms.

In some embodiments, the processing algorithms retrieved from the data repository include a facial recognition algorithm responsive to the one or more de-identification parameters. For example, the facial recognition algorithm may be a facial recognition algorithm for recognizing patient faces, staff faces, or specific facial features of various combinations of same.

Optionally, at step 1804, the fastest algorithms which comply with the de-identification parameters may be selected for processing clinical data.

The one or more de-identification parameters may include parameters associated with the recognition algorithms.

For example, the one or more de-identification parameters may include parameters associated with clinical staff de-identification parameters or patient de-identification parameters. The de-identification parameters can describe that patient faces and voices require replacement/augmentation, but that staff faces do not need to be blurred.

In another example embodiment, the one or more de-identification parameters may specify the size of a region geometry. For example, the geometry may include a size, shape, etc.

The one or more de-identification parameters may include parameters associated with the obscuring algorithms.

For example, the de-identification parameters may specify which types of obscuring algorithms are acceptable (e.g., blurring vs blacking out). In another example, the de-identification parameters may include limitations on the operation of specific obscuring algorithms, such as specifying that replacement of a visual or audio feature can only be completed with stock images to avoid copyright claims.

At step 1806, clinical data obtained in a clinical environment is received. In some embodiments where method 1800 is implemented on a system local to the video recording hardware, the video data may be streamed to the configuration device 102. In some embodiments, for example, clinical data may include video data that is received from a remote video recording hardware (not shown).

At step 1808, the clinical data is processed with the one or more selected processing algorithms. For example, a first recognition algorithm may detect a face, while a second recognition algorithm may detect identifying body marks, such as birth marks.

In some embodiments, the one or more recognition algorithms may be adjusted to deactivate functionality unrelated to the one or more de-identification parameters. For example, the recognition algorithm which detects eyes may detect faces as a precursor step. Continuing the example, the eye detection recognition algorithm may be adjusted to stop once a face is detected, and used as an alternative facial recognition algorithm.

In some embodiments, at step 1808, regions corresponding to detected personalized features in the clinical data are computed with the retrieved one or more recognition algorithms. For example, a bounding box associated with a face may be computed. The bounding box may be square, or include various complex geometries in order to de-identify only data which is required to be de-identified. More complex geometries may be advantageous where identifying features are located close to areas of interest.

In some embodiments, at step 1808, for each region corresponding to a detected personalized feature, obscured clinical data is generated with the retrieved one or more obscuring algorithms.

In some embodiments, at step 1808, de-identified clinical data is generated by integrating the clinical data and the obscured clinical data. For example, the obscured clinical data may be irrevocably overlaid over the clinical data.

Optionally, at various junctures (before or after step 1808, for example), a portion of the clinical data and/or the obscured clinical data may be provided to a human operator to conduct a manual quality assurance process. The quality assurance process may include any of the processes disclosed herein (e.g., for review of still objects, moving objects, or working regions) or other quality assurance processes. In some embodiments, the output of the quality assurance process may be integrated into the obscured clinical data, e.g., to obscure or otherwise process regions or objects identified manually during the quality assurance process. In some embodiments, the output of the quality assurance process may be used to train one or more of the processing algorithms (e.g., the detection algorithms), to thereby improve the performance of such algorithms in response to such training. In some embodiments, the output of the quality assurance process may be used to compute performance metrics of the quality or thoroughness of de-identification, and such metrics may be used to assess compliance with applicable de-identification requirements.

At step 1810, the de-identified clinical data is outputted. The output may include executable code, which when run by a processor, provides clinical data in accordance with the de-identification requirements.

Optionally, after completion of step 1810, a compliance certificate may be output, indicating that the clinical data has been de-identified in compliance with applicable requirements. In some embodiments, the compliance certificate may include an indication of whether the de-identification process utilized a manual quality assurance process as disclosed herein.

After completion of step 1810, the de-identified clinical data may be transmitted to a processor for encrypting. For example, the processor performing the de-identification may be a processor local to a hospital, while the processor performing the encryption may be a cloud computing processor.

Alternatively, the de-identified clinical data may be encrypted with the processor performing method 1800, and the encrypted de-identified clinical data may be transmitted for storage. The encrypted de-identified clinical data may be transmitted to a cloud computing service, for example, or transmitted to a non-transitory computer readable storage medium (e.g., a local drive within a hospital network system) for storage.

Where methods 1700 and 1800 includes a single combination of steps, various possible combinations of the disclosed steps are contemplated.

Figure 19:
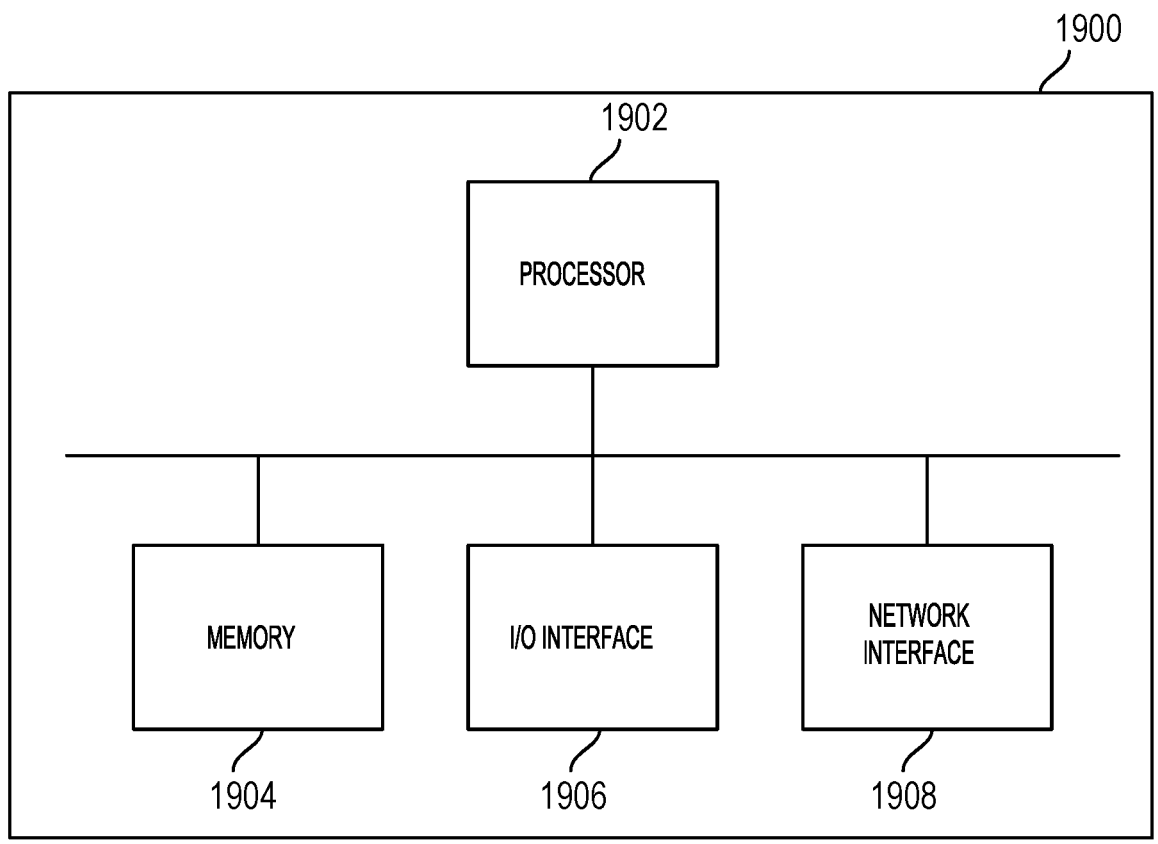
FIG. 19 is a schematic diagram of a computing device, in accordance with an embodiment.

FIG. 19 is a schematic diagram of a computing device 1900, in accordance with an embodiment. A computing device 1900 may function as a configuration device 102, a de-identification device 110, a client device 104, or a data source 106.

As depicted, computing device 1900 includes at least one processor 1902, memory 1904, at least one I/O interface 1906, and at least one network interface 1908.

Each processor 1902 may be, for example, various types of microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or various combination thereof.

Memory 1904 may include a suitable combination of various type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1906 enables computing device 1900 to interconnect with one or more input devices, such as a keyboard, mouse, camera, touch screen and a microphone, or with one or more output devices such as a display screen and a speaker.

Each network interface 1908 enables computing device 1900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including various combinations of these.

In some embodiments, the computing device 1900 includes a firewall (not shown), which restricts flow of data to and from components of computing device 1900. For example, requests to the network interface 1908 to access the processor 1082 or the memory 1904 may be restricted by the firewall. In some embodiments, the firewall is a separate component, or the firewall may be integrated with the network interface 1908, the processor 1902, and so forth.

System 100 may include multiple computing devices 102. The computing devices 102 may be the same or different types of devices. The computing device 102 may be connected in various ways including directly coupled, indirectly coupled via a network, and distributed over a wide geographic area and connected via a network (which may be referred to as "cloud computing").

For example, and without limitation, a configuration device 102 may be a server, network appliance, set-top box, embedded device, computer expansion module, personal computer, laptop, personal data assistant, cellular telephone, smartphone device, UMPC tablets, video display terminal, gaming console, or other computing device capable of being configured to carry out the methods described herein.

In some embodiments, each of data modeller 112, interface generator 114, compliance analyzer 116, and configuration data structure generator 118 are implemented at a separate computing device.

In some embodiments, all or parts of data modeller 112, interface generator 114, compliance analyzer 116, and configuration data structure generator 118 may be implemented using conventional programming languages such as Java, J#, C, C++, C#, Perl, Visual Basic, Ruby, Scala, etc. In some embodiments, these components of system 100 may be in the form of one or more executable programs, scripts, routines, statically/dynamically linkable libraries, or the like.

The foregoing discussion provides many some embodiments of the example subject matter. Although each embodiment represents a single combination of elements, the subject matter is considered to include all possible combinations of the disclosed elements. Thus if one embodiment comprises elements A, B, and C, and a second embodiment comprises elements B and D, then the subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for configuring a de-identification system, the method comprising:
maintaining at least one electronic data model including a plurality of de-identification requirements for removing personal information from clinical video data obtained in a clinical environment, the plurality of de-identification requirements including requirements applicable to at least one jurisdiction of a plurality of jurisdictions, the plurality of de-identification requirements including at least a first set of de-identification requirements to remove visual or audio identifying elements and a second set of de-identification requirements to preserve visual or audio elements;
receiving an identifier identifying one of the jurisdictions;
traversing the electronic data model to determine a subset of the plurality de-identification requirements applicable to the identified jurisdiction, the electronic data model populated using a set of nested de-identification requirements, the nested de-identification requirements including at least both an umbrella jurisdiction and a sub-jurisdiction;
receiving data defining a user selection of operating parameters of the de-identification system;
analyzing the user selection for conformity with the subset of the de-identification requirements;
in response to determining the user selection conforms with the subset of the de-identification requirements, generating a signal indicating the conformity;
generating a configuration data structure including data reflective of the user selection of operating parameters; and
transforming the clinical video data using a trained machine learning model that receives as an input data set the configuration data structure representing the subset of the plurality of the de-identification requirements applicable to the identified jurisdiction and the clinical video data to generate de-identified clinical video data.

2. The method of claim 1, wherein the transforming of the clinical video data further includes modifying a compression rate of the generated de-identified clinical video data.

3. The method of claim 1, wherein the maintaining the at least one electronic data model includes:
retrieving one or more of the de-identification requirements from an electronic database, each of the one or more de-identification requirements for removing personal information being associated with a respective jurisdiction;
populating the electronic data model by associating the retrieved one or more de-identification requirements with the respective jurisdiction.

4. The method of claim 1, wherein:
the plurality of de-identification requirements include requirements applicable to at least one compliance regime of a plurality of compliance regimes;
the identifier identifies one of the compliance regimes; and
traversing the electronic data model to determine the subset of the de-identification requirements includes determining the subset of the de-identification requirements applicable to the identified jurisdiction and the identified compliance regime.

5. The method of claim 1, further comprising:
presenting an interactive user interface having a plurality of user interface elements for defining the user selection of operating parameters of the de-identification system.

6. The method of claim 5, wherein the user interface elements include one or more default de-identification requirements.

7. The method of claim 5, further comprising:
in response to determining the user selection conforms with the subset of the de-identification requirements, modifying the interactive user interface to provide a visual indicator of the conformity.

8. The method of claim 5, further comprising:
in response to determining the user selection does not conform with the subset of the de-identification requirements, modifying the interactive user interface to provide a warning visual indicator.

9. The method of claim 5, further comprising:
modifying the interactive user interface to include user interface elements for user input of additional identifiers of the de-identification system;
updating the subset of the de-identification requirements by traversing the at least one electronic data model to determine de-identification requirements applicable to the input additional identifiers.

10. The method of claim 5, further comprising:
in response to detecting hovering near the user interface elements, modifying the interactive user interface to include an information visual indicator associated with the hovered near user interface element.

11. The method of claim 5, further comprising:
populating the interactive user interface with an input interface for receiving new de-identification requirements;
updating the at least one electronic data model with the received new de-identification requirements.

12. The method of claim 5, wherein the presenting the interactive user interface comprises:
determining one or more operating parameters in response to the determining the subset of the de-identification requirements; and
populating the interactive user interface with the determined one or more operating parameters.

13. The method of claim 1, wherein the de-identification requirements include contractual obligations, and the determined one or more operating parameters include one or more face de-identification algorithms.

14. The method of claim 1, wherein the user selection of operating parameters of the de-identification system includes a user selection of a quality assurance process.

15. A non-transitory computer readable tangible storage medium, when executed by a processor, cause the processor to perform a computer-implemented method for configuring a de-identification system, the method comprising:
maintaining at least one electronic data model including a plurality of de-identification requirements for removing personal information from clinical video data obtained in a clinical environment, the plurality of de-identification requirements including requirements applicable to at least one jurisdiction of a plurality of jurisdictions, the plurality of de-identification requirements including at least a first set of de-identification requirements to remove visual or audio identifying elements and a second set of de-identification requirements to preserve visual or audio elements;
receiving an identifier identifying one of the jurisdictions;
traversing the electronic data model to determine a subset of the plurality of de-identification requirements applicable to the identified jurisdiction, the electronic data model populated using a set of nested de-identification requirements, the nested de-identification requirements including at least both an umbrella jurisdiction and a sub-jurisdiction;
receiving data defining a user selection of operating parameters of the de-identification system;
analyzing the user selection for conformity with the subset of the de-identification requirements;
in response to determining the user selection conforms with the subset of the de-identification requirements, generating a signal indicating the conformity;
generating a configuration data structure including data reflective of the user selection of operating parameters; and
transforming the clinical video data using a trained machine learning model that receives as an input data set the configuration data structure representative of the subset of the plurality of the de-identification requirements applicable to the identified jurisdiction and the clinical video data to generate de-identified clinical video data.

16. A computer-implemented system for configuring a de-identification system, the computer-implemented system comprising:
a processor connected to a non-transitory computer readable storage medium with executable instructions for causing the processor to:
maintain at least one electronic data model including a plurality of de-identification requirements for removing personal information from clinical video data obtained in a clinical environment, the plurality of de-identification requirements including requirements applicable to at least one jurisdiction of a plurality of jurisdictions, the plurality of de-identification requirements including at least a first set of de-identification requirements to remove visual or audio identifying elements and a second set of de-identification requirements to preserve visual or audio elements;
receive an identifier identifying one of the jurisdictions;
traverse the electronic data model to determine a subset of the de-identification requirements applicable to the identified jurisdiction, the electronic data model populated using a set of nested de-identification requirements, the nested de-identification requirements including at least both an umbrella jurisdiction and a sub-jurisdiction;
receive data defining a user selection of operating parameters of the de-identification system;
analyze the user selection for conformity with the subset of the de-identification requirements;
in response to determining the user selection conforms with the subset of the de-identification requirements, generate a signal indicating the conformity; and
generate a configuration data structure including data reflective of the user selection of operating parameters; and
transform the clinical video data using a trained machine learning model that receives as an input data set the configuration data structure representative of the subset of the plurality of the de-identification requirements applicable to the identified jurisdiction and the clinical video data to generate de-identified clinical video data.

17. The system of claim 16, wherein the clinical video data includes at least one of audio data, video data, audio-video data, device data, or text data.

18. The system of claim 16, wherein:
the plurality of de-identification requirements include requirements applicable to at least one compliance regime of a plurality of compliance regimes; and
the identifier identifies one of the compliance regimes.

19. The system of claim 16, wherein the executable instructions further cause the processor to:
present an interactive user interface having a plurality of user interface elements for defining the user selection of operating parameters of the de-identification system.

20. The system of claim 19, wherein the user interface elements include one or more default de-identification requirements.

\* \* \* \* \*